United States Patent
Cha et al.

(10) Patent No.: US 11,026,134 B2
(45) Date of Patent: Jun. 1, 2021

(54) METHOD AND APPARATUS FOR SUPPORTING HANDOVER

(71) Applicant: Samsung Electronics Co., Ltd., Suwon-si (KR)

(72) Inventors: Hwajin Cha, Seongnam-si (KR); Sung Hwan Won, Seoul (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 16/082,510

(22) PCT Filed: Mar. 8, 2017

(86) PCT No.: PCT/KR2017/002500
§ 371 (c)(1),
(2) Date: Sep. 5, 2018

(87) PCT Pub. No.: WO2017/155299
PCT Pub. Date: Mar. 8, 2017

(65) Prior Publication Data
US 2019/0098546 A1 Mar. 28, 2019

(30) Foreign Application Priority Data
Mar. 8, 2016 (KR) .................. 10-2016-0027822

(51) Int. Cl.
*H04W 36/12* (2009.01)
*H04W 36/00* (2009.01)
(Continued)

(52) U.S. Cl.
CPC ......... *H04W 36/0055* (2013.01); *H04W 8/02* (2013.01); *H04W 36/12* (2013.01);
(Continued)

(58) Field of Classification Search
CPC . H04W 36/38; H04W 36/08; H04W 36/0088; H04W 36/14; H04W 36/12;
(Continued)

(56) References Cited

U.S. PATENT DOCUMENTS 8,442,535 B2 * 5/2013 Yang ................. H04W 36/0066
455/436
8,670,342 B2 * 3/2014 Norefors ............... H04W 60/04
370/252
(Continued)

FOREIGN PATENT DOCUMENTS

KR 10-2011-0070570 A 6/2011
KR 10-2015-0069446 A 6/2015
(Continued)

OTHER PUBLICATIONS

ISA/KR, International Search Report and Written Opinion of the International Search Authority, International Application No. PCT/KR2017/002500, dated Jun. 23, 2017, 10 pages.
(Continued)

*Primary Examiner* — Hanh N Nguyen

(57) ABSTRACT

The present invention relates to a method and an apparatus for supporting a handover and, more particularly, to a method and an apparatus for changing a mobile management entity while maintaining a connection state of a connection mode terminal. In order to achieve the above-mentioned objective, a method for supporting a handover of a serving mobile management entity (MME) according to one embodiment of the present invention comprises the steps of: receiving a tracking area update (TAU) request message from a terminal: determining whether the serving MME of the terminal needs to be changed, on the basis of the TAU request message; and transmitting, in the case where it is
(Continued)

determined that the serving MME of the terminal needs to be changed, an MME change request message to an eNB.

15 Claims, 16 Drawing Sheets

(51) Int. Cl.
  *H04W 8/02* (2009.01)
  *H04W 36/32* (2009.01)
  *H04W 36/38* (2009.01)
  *H04W 88/14* (2009.01)
  *H04W 60/00* (2009.01)
  *H04W 88/08* (2009.01)

(52) U.S. Cl.
  CPC ........... *H04W 36/32* (2013.01); *H04W 36/38* (2013.01); *H04W 88/14* (2013.01); *H04W 60/005* (2013.01); *H04W 88/08* (2013.01)

(58) Field of Classification Search
  CPC . H04W 36/165; H04W 36/0055; H04W 8/02; H04W 36/32; H04W 88/14; H04W 60/005; H04W 88/085
  See application file for complete search history.

(56) References Cited

U.S. PATENT DOCUMENTS

| | | | | |
|---|---|---|---|---|
| 9,467,843 | B1* | 10/2016 | Smith | H04W 16/14 |
| 9,807,548 | B2* | 10/2017 | Kahn | H04W 4/021 |
| 2007/0213060 | A1 | 9/2007 | Shaheen | |
| 2010/0080186 | A1 | 4/2010 | Guo et al. | |
| 2011/0171979 | A1 | 7/2011 | Rune | |
| 2013/0083650 | A1* | 4/2013 | Taleb | H04W 24/04 370/218 |
| 2016/0192263 | A1* | 6/2016 | Zembutsu | H04W 36/0005 370/331 |
| 2017/0094577 | A1* | 3/2017 | Kim | H04W 36/38 |
| 2017/0099623 | A1 | 4/2017 | Shi et al. | |
| 2017/0188280 | A1 | 6/2017 | Watfa et al. | |

FOREIGN PATENT DOCUMENTS

| | | |
|---|---|---|
| KR | 10-2015-0084426 A | 7/2015 |
| WO | 2015172088 A1 | 11/2015 |
| WO | 2015192323 A1 | 12/2015 |

OTHER PUBLICATIONS

3GPP TS 29.274 V13.4.0 (Dec. 2015), Technical Specification, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 13), 336 pages.
European Patent Office, "Supplementary European Search Report," Application No. EP 17763560.4, dated Oct. 8, 2018, 7 pages.

* cited by examiner

METHOD AND APPARATUS FOR SUPPORTING HANDOVER

CROSS-REFERENCE TO RELATED APPLICATIONS

This application is a 371 National Stage of International Application No. PCT/KR2017/002500 filed Mar. 8, 2017, which claims priority to Korean Patent Application No. 10-2016-0027822 filed Mar. 8, 2016, the disclosures of which are herein incorporated by reference in their entirety.

BACKGROUND

1. Field

The present disclosure relates to a method and an apparatus for supporting a handover, and more particularly, to a method and an apparatus for changing a mobility management entity while maintaining a connection state of a connection mode terminal.

2. Description of Related Art

In general, in a wireless communication system, a terminal may perform registration in a mobile management entity (MME) through a connection procedure, and may be provided with a service through the corresponding MME in an MME pool area of the MME in which the terminal has been registered. Here, the MME pool means an inherent MME group in a public land mobile network (PLMN), and the terms "MME pool" and "MME group" may be mixedly used. The MME group area is an area managed by the MME group. That is, while the terminal is in the MME group area, it can be serviced without changing a serving MME, whereas if it deviates from the MME group area, the serving MME should be changed.

For example, if a channel state between a terminal and a specific cell gets worse or movement of the terminal is detected in a state where the terminal accesses the cell and is provided with a service, the terminal may perform a handover to a cell that takes charge of an adjacent area. Handover methods may differ as follows depending on the configuration of a base station taking charge of a source cell in which the terminal is currently serviced and a target cell to which the terminal is to perform the handover, the configuration of the MME group, and X2 connection state.

Intra-eNB handover: In case where one base station simultaneously takes charge of a source cell and a target cell Inter-eNB X2 handover: In case where different base stations take charge of a source cell and a target cell, respectively, a target base station belongs to an MME group area called by a serving MME of a terminal, and a handover is possible based on X2 connection between a source base station and the target base station Inter-eNB S1 handover: In case where different base stations take charge of a source cell and a target cell, respectively, and 1) there is no X2 connection between a source base station and a target base station, or 2) the target base station does not belong to an MME group area called by a serving MME of a terminal When one base station is connected to two or more MME groups, in the related art, all cells that the base station takes charge of constitute an overlapping MME pool area that is simultaneously managed by all the MME groups connected to the base station.

FIG. 1 is a diagram illustrating a network environment in which a plurality of cells in a base station are managed by the same mobile management entity (MME) group.

Referring to FIG. 1, areas managed by MME group A 100, MME group B 103, and MME group C 105 are respectively called an MME group A area, an MME group B area, and an MME group C area. A base station 110 is connected to the MME group A 100 and the MME group B 103, and all cells 120, 123, and 125 in the base station 110 belong to the MME group A area and the MME group B area. Further, a base station 115 is connected to the MME group B 103 and the MME group C 105, and all cells 130 and 135 in the base station 115 belong to the MME group B area and the MME group C area. Accordingly, during a handover between cells in the base station 110 or the base station 115, the MME groups are not changed, and thus a serving MME of a terminal is not changed.

However, if a single base station is connected to several MME groups, and different MME groups manage the respective cells, the serving MME of the terminal should be changed even in case of the handover between the cells in the single base station.

SUMMARY

In order to solve the above-described problem, an aspect of the present disclosure provides a method and an apparatus for connecting a terminal to a specific MME group in accordance with an area to which a base station provides a service and the service type in case where one base station is connected to two or more MME groups. Further, another aspect of the present disclosure proposes a method and an apparatus for performing an intra-eNB handover (HO) with MME relocation (or MME change) while maintaining a connection mode state of a terminal.

In one aspect of the present disclosure, a method by a mobile management entity (MME) for supporting a handover includes receiving a non-access stratum (NAS) message from a terminal; determining whether a serving MME relocation of the terminal is necessary based on the NAS message; and transmitting an MME relocation request message to a base station if it is determined that the serving MME relocation of the terminal is necessary.

In another aspect of the present disclosure, a method by a base station for supporting a handover includes receiving a NAS message from a terminal and transmitting the NAS message to a serving MME; and receiving an MME relocation request message from the serving MME, wherein the MME relocation request is received based on whether a serving MME relocation of the terminal based on the NAS message is necessary.

In still another aspect of the present disclosure, a mobile management entity (MME) supporting a handover includes a communication unit configured to transmit and receive signals; and a controller configured to control the communication unit to receive a NAS message from a terminal, determine whether a serving MME relocation of the terminal is necessary based on the NAS message, and control the communication unit to transmit an MME relocation request message to a base station if it is determined that the serving MME relocation of the terminal is necessary.

In yet still another aspect of the present disclosure, a base station supporting a handover includes a communication unit configured to transmit and receive signals; and a controller configured to control the communication unit to receive a NAS message from a terminal and transmit the NAS message to a serving MME, and receive an MME relocation request message from the serving MME, wherein the MME relocation request is received based on whether a serving MME relocation of the terminal based on the NAS message is necessary.

According to the embodiments of the present disclosure, since the intra-eNB handover (HO) with MME relocation of the connection mode terminal is performed if the serving MME relocation is necessary, service interruption due to the serving MME relocation of the connection mode terminal is prevented, and reception of a service from a suitable MME is supported.

In particular, even in case where a subscriber terminal of a specific service in the connection mode state has moved to an area to which the specific service should be provided through a separate MME group, the service can be provided from the MME of the MME group suitable to the service without interruption.

DETAILED DESCRIPTION

Figure 1:
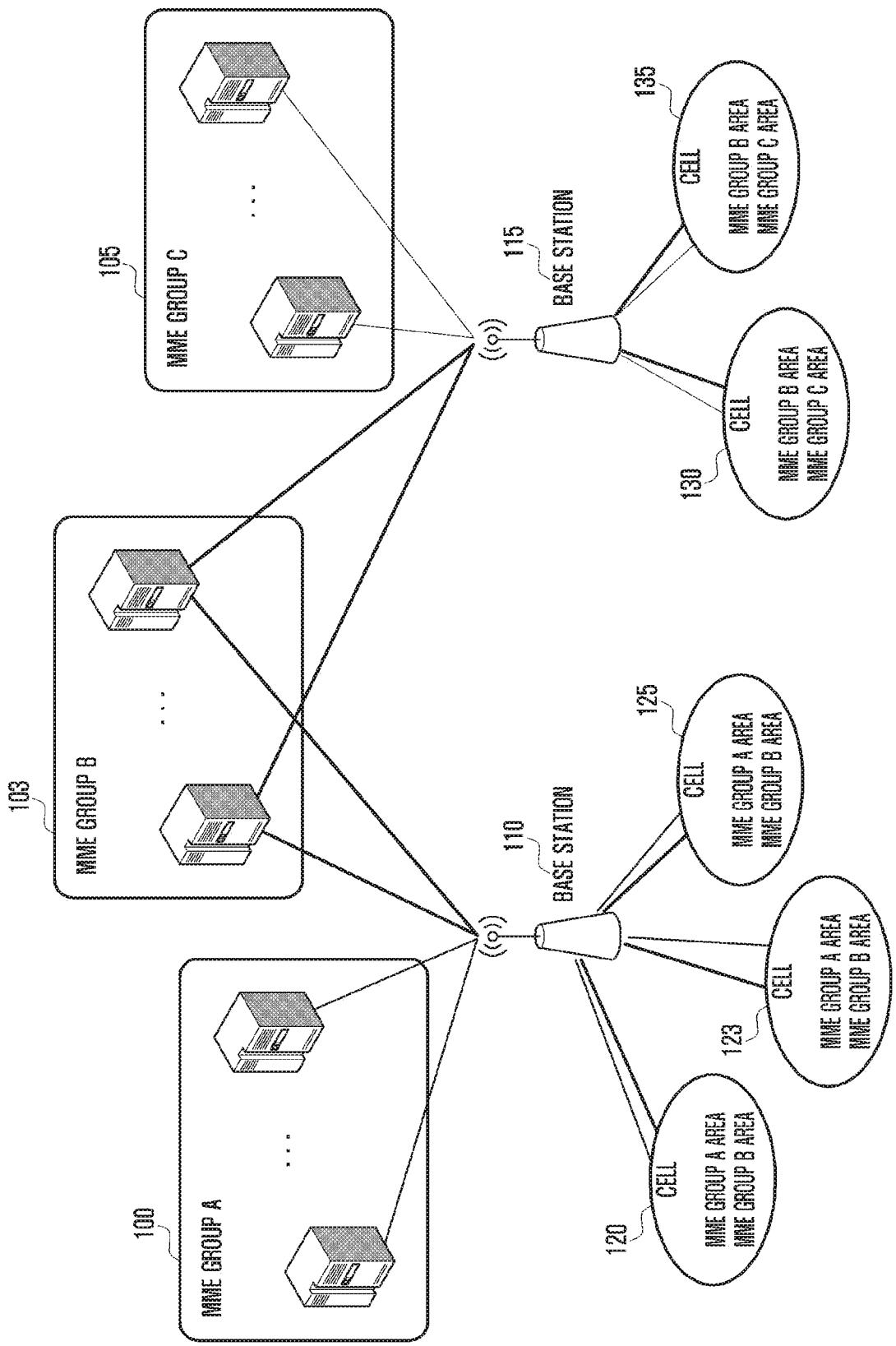
FIG. 1 is a diagram illustrating a network environment in which a plurality of cells in a base station are managed by the same mobile management entity (MME) group.

Hereinafter, preferred embodiments of the present disclosure will be described in detail with reference to the accompanying drawings. In the accompanying drawings, it is to be noted that the same reference numerals are used for the same constituent elements. Further, a detailed description of known functions and configurations will be omitted if it obscures the subject matter of the present disclosure.

Hereinafter, preferred embodiments of the present disclosure will be described in detail with reference to the accompanying drawings. In the accompanying drawings, it is to be noted that the same reference numerals are used for the same constituent elements. Further, a detailed description of known functions and configurations will be omitted if it obscures the subject matter of the present disclosure.

Further, in describing in detail embodiments of the present disclosure, a 4G communication system including an advanced E-UTRA (or so called LTE-A) system supporting carrier aggregation will be the main subject. However, the primary gist of the present disclosure can be applied to other communication systems having similar technical background and channel types through slight modifications thereof in a range that does not greatly deviate from the scope of the present disclosure, and this will be possible by the judgement of those skilled in the art to which the present disclosure pertains. For example, the primary gist of the present disclosure can be applied even to multicarrier HSPA supporting the carrier aggregation and a 5G communication system that is the next-generation network.

In explaining embodiments of the present disclosure, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, as an example, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

In the present disclosure, the term "state model" is generated through learning of several data logs determining the state of a device at a past time with respect to the state of the device, for example, a resource use state and a power use state of the device, and is called output of the result of prediction with respect to the state of the device at a future time in case where more than a determined amount of data logs is input.

In the present disclosure, the term "state related information" calls information on the state of the device, for example, a cause of determining software and hardware states of the device. The state related information may be derived from the state model generated based on state learning data. The state related data may include at least one parameter for determining the state, and the parameter may further include weight information indicating the degree of the state determination.

Further, in the present disclosure, the term "model related information" may include data log characteristics used to generate the state model in the device, algorithm, parameter characteristic information, or accuracy information of the state model.

Figure 2A:
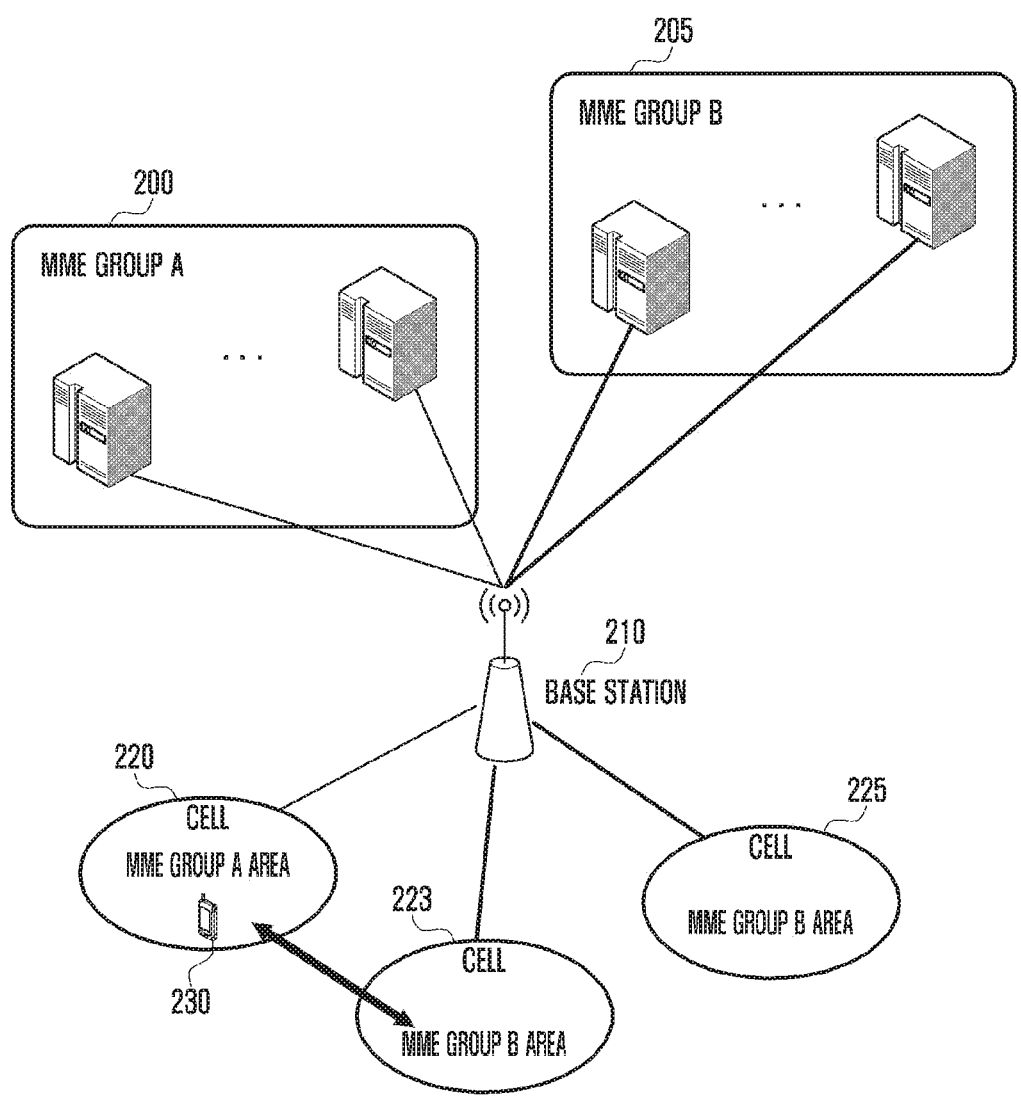
FIGS. 2A and 2B are diagrams illustrating a network environment in which a plurality of cells in a base station are managed by several MME groups.
Figure 2B:
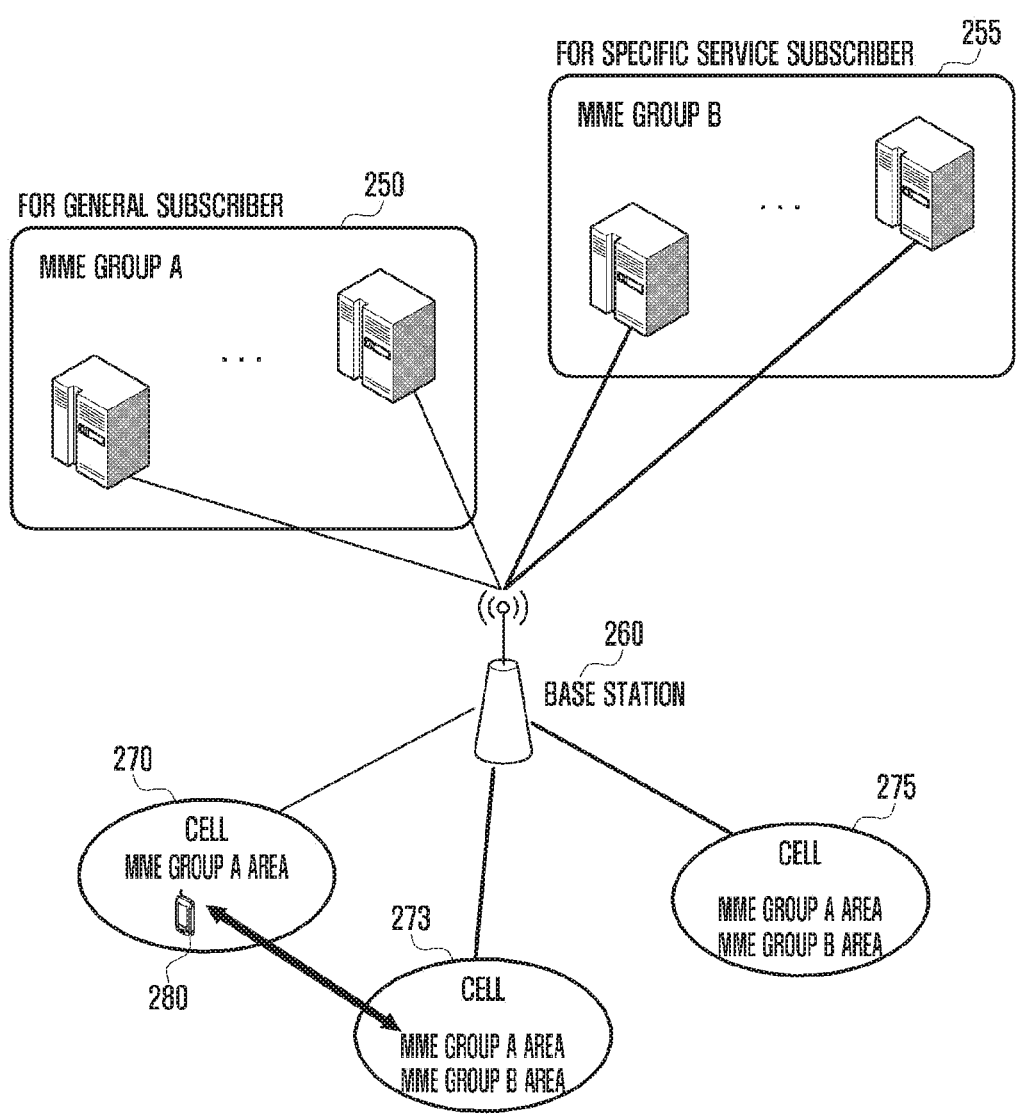

FIGS. 2A and 2B are diagrams illustrating a network environment in which a plurality of cells in a base station are managed by several MME groups.

Referring to FIG. 2A, if it is assumed that areas managed by MME group A 200 and MME group B 205 are an MME group A area and an MME group B area, a base station 210 is connected to the MME group A 200 and the MME group B 205, one 220 of cells that the base station 210 takes charge of belongs to the MME group A area, and the remaining cells 223 and 225 belong to the MME group B area. In this case, even if a terminal 230 performs intra-eNB (base station 210) handover from the cell 220 to the cell 223, a serving MME of the terminal should be changed to continuously provide a service to the terminal during an inter-cell handover between cells belonging to different MME group areas.

In an environment of a cloud RAN that is rising as the next-generation technology, one logical base station manages a plurality of cells, and thus as shown in FIGS. 2A and 2B, one base station takes charge of a considerably wide area. Accordingly, a non-overlapping MME pool area managed for each MME group connected to the base station may differ. In this case, as described above, even in case of the inter-cell handover in a single base station, it is required to change the serving MME of the terminal.

Further, referring to FIG. 2B, in an environment in which a dedicated MME group for providing a specific service in a specific area is used, a base station that is a cloud RAN may be connected to a dedicated MME group, and may operate to make it possible to provide a specific service to only partial areas of a plurality of cells managed by the base station. More specifically, if it is assumed that areas managed by MME group A 250 for a general subscriber and MME group B 255 for a specific service subscriber are an MME group A area and an MME group B area, respectively, the base station 260 is connected to the MME group A 250 and the MME group B 255, and one 270 of cells that the base station 260 takes charge of belongs to the MME group A area, whereas the remaining cells 273 and 275 belong to the MME group A area and the MME group B area, respectively. In this case, in order to be provided with the specific service in case where a terminal 280 having subscribed to the specific service performs intra-eNB (base station 210) handover from the cell 270 to the cell 273, a serving MME of the terminal should be changed to an MME belonging to the MME group B to be provided with a proper service even during an inter-cell handover in the base station.

However, in case where the connection mode terminal moves between individual MME group areas in an environment in which one base station provides a service to a plurality of cells managed by a plurality of MME groups, it deviates from a registered tracking area of the terminal, and thus the serving MME of the terminal should be relocated to continue providing of the service. However, in an S1 connection process between the base station and the MME, it is not reported to the base station what TA is supported by the MME or the MME group to which the MME belongs. Accordingly, the base station cannot know what TA the connected MME group supports and which TA the terminal has been registered in, and thus the base station cannot recognize that the serving MME relocation of the terminal is necessary due to an intra-eNB handover (HO) of the base station that belongs to a different TA. If the terminal transmits a TA update request in such a situation, the serving MME having received this recognizes the necessity of the serving MME relocation, and rejects the TA update request.

Figure 3A:
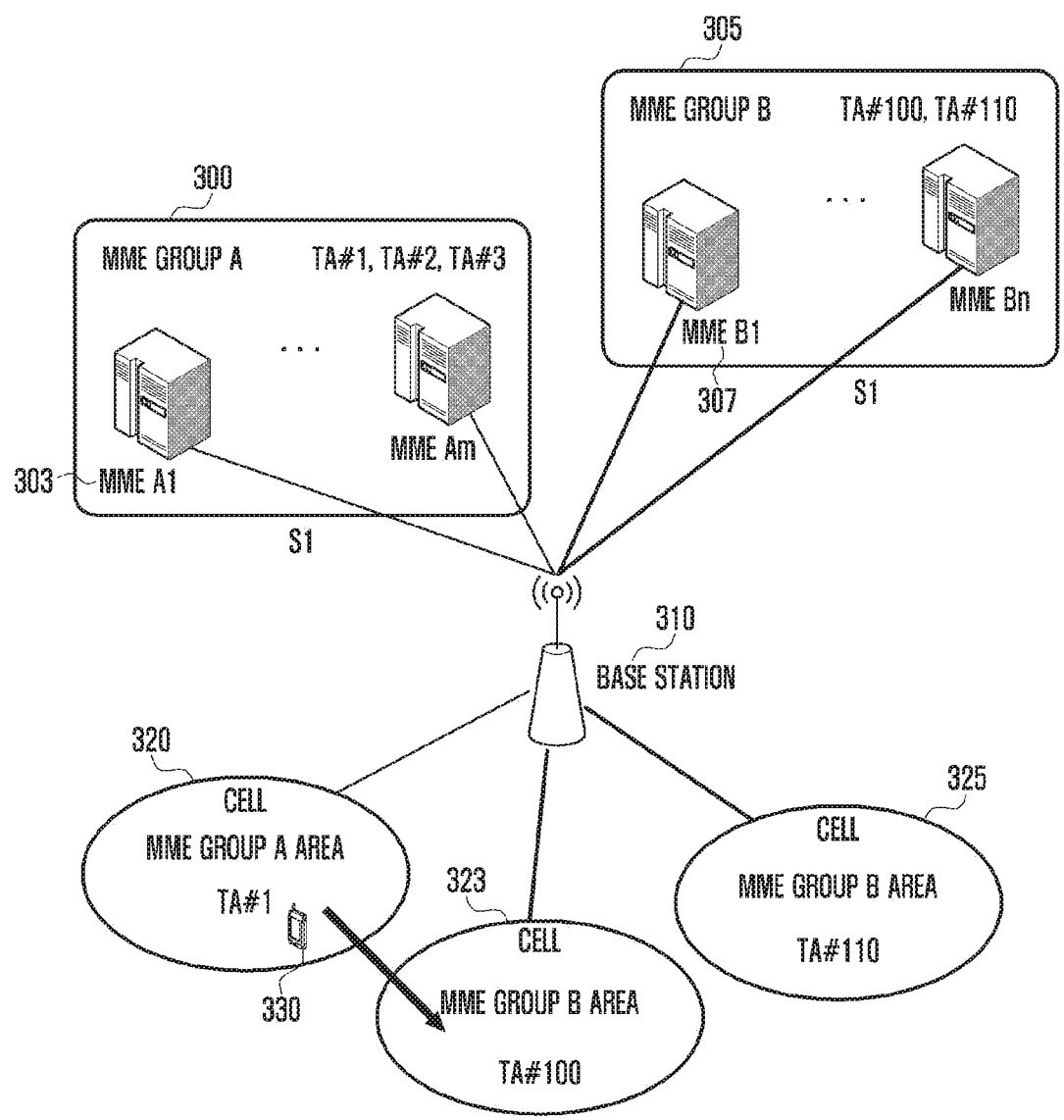
FIGS. 3A and 3B are diagrams illustrating a case where a terminal performs intra-eNB S1 handover in a network environment in which a plurality of cells in a base station are managed by several MME groups.
Figure 3B:
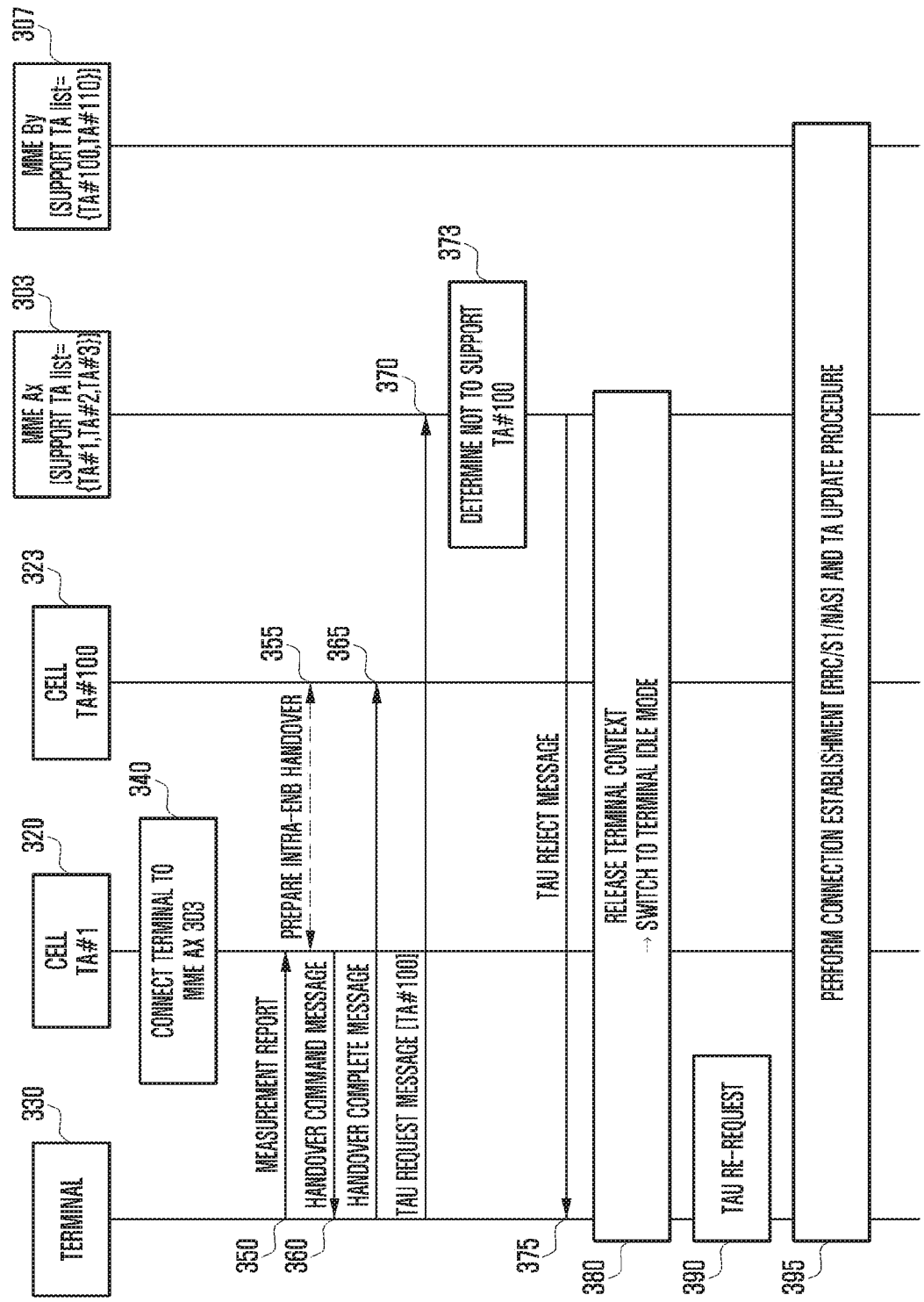

FIGS. 3A and 3B are diagrams illustrating a case where a terminal performs intra-eNB S1 handover in a network environment in which a plurality of cells in a base station are managed by several MME groups.

More specifically, FIG. 3A is a diagram illustrating a case where a terminal performs intra-eNB S1 handover in the network environment illustrated in FIG. 2A.

Referring to FIG. 3A, a plurality of MMEs are classified into MME group A 300 and MME group B 305 for each area, and a tracking area (TA) list corresponding to the MME group A includes TA #1, TA #2, and TA #3, and a TA list corresponding to the MME group B includes TA #100 and TA #110. The base station 310 located in a boundary area between the areas is connected to the MME group A 300 and the MME group B 305. A plurality of cells 320, 323, and 325 are all connected to the base station 301 in a manner that the cell 320 belonging to TA #1 is connected to the MME group A, and the cell 323 belonging to TA #100 and the cell 325 belonging to TA #110 are connected to the MME group B.

Each of the MME groups registers and manages the TA list in the terminal based on the support area. This is to recognize if the terminal deviates from the area that the MME group takes charge of. In an example illustrated in the drawing, the terminal, of which the serving MME is an MME of the MME group A is connected to the cell 320, receives {TA #1, TA #2, TA #3} corresponding to the registered TA list. If the terminal moves to a TA that is not included in the TA list, it requests TA update.

If the terminal that receives a service through the serving MME 303 of the MME group A in the cell 320 belonging to TA #1 performs intra-eNB handover (HO) to the cell 323 belonging to TA #100, it recognizes entering into a new TA, and requests TA update from the serving MME 303. However, since the serving MME 303 of the terminal belongs to the MME group A and thus cannot provide the service to the terminal any further, the TA update request is rejected by the serving MME 303, and thus the terminal re-requests the TA update after shifting from a connection mode to an idle mode. Thereafter, the terminal performs connection setup to the network again, and cannot resume the service until the TA update succeeds. If the base station does not select a proper MME, that is, MME 307 belonging to the MME group B supporting TA #100 that is the area of the cell 323, in the connection setup operation as described above, failure of the TA update may be repeated.

Referring to FIG. 3B, against the problem as described above with reference to FIG. 3A, operations of respective devices can be known. More specifically, the terminal 330, which is in a connected state 340 to the cell 320, receives and registers TA list={TA #1, TA #2, TA #3} as described above. The terminal 330 may transmits a measurement report to the cell 320. It is assumed that the TA of the cell 320 is TA #1. If a handover from the cell 320 to the cell 323 of which the TA is TA #100 is determined based on the measurement report, the cell 320 may prepare the intra-eNB handover 355 to the cell 323, and may transmit a handover command message to the terminal 330 (360). In response to the reception of the handover command message, the terminal 330 may transmit a handover complete message to the cell 323. If it is identified that the TA of the cell 323 is not in the registered TA list, the terminal 330 may transmit a tracking area update (TAU) request message to MME Ax 303 belonging to the MME group A (370). In this case, the terminal 330 may include TA #100 that is the TA of the cell 323 in the TAU request message to be transmitted. If it is determined that the MME group A does not support TA #100 (373), the MME Ax 303 may transmit a TAU reject message to the terminal 330 to relocate the serving MME (375).

Thereafter, the terminal 330 performs a terminal context release procedure in response to the received TAU reject message, and switches to the idle mode (380). Thereafter, the terminal re-requests the TAU (390), and in accordance with the TAU re-request, performs a connection establishment operation and TA update procedure through RRC, S1, and non-access stratum (NAS) messages between the terminal and MME By 307 (395). Even in this case, the TAU failure may be repeated until the base station 310 selects and connects the MME that supports the cell 323 in the connection setup process.

Figure 4A:
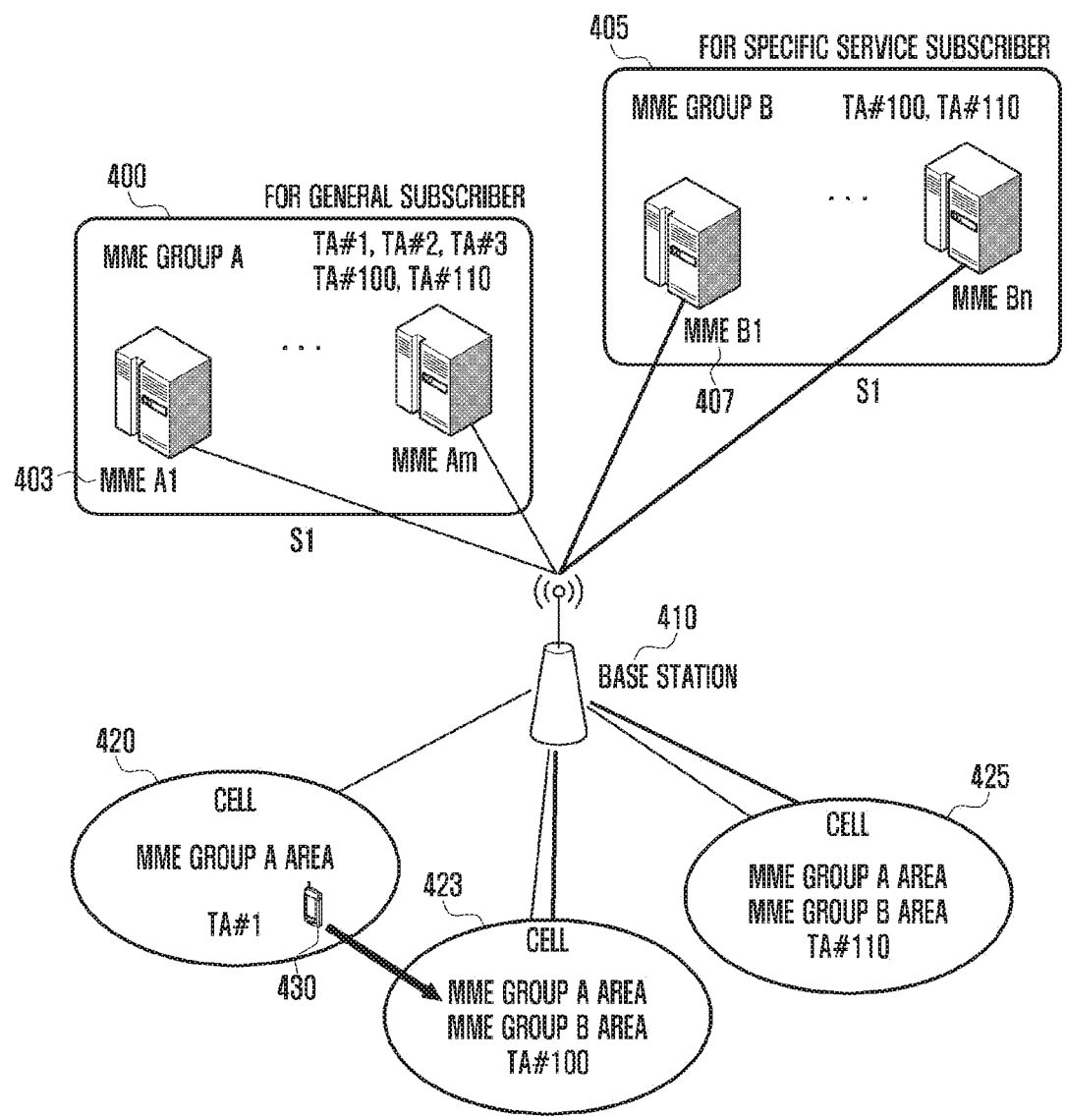
FIGS. 4A and 4B are diagrams illustrating a case where a terminal performs intra-eNB S1 handover in a network environment in which a plurality of cells in a base station are managed by several MME groups.
Figure 4B:
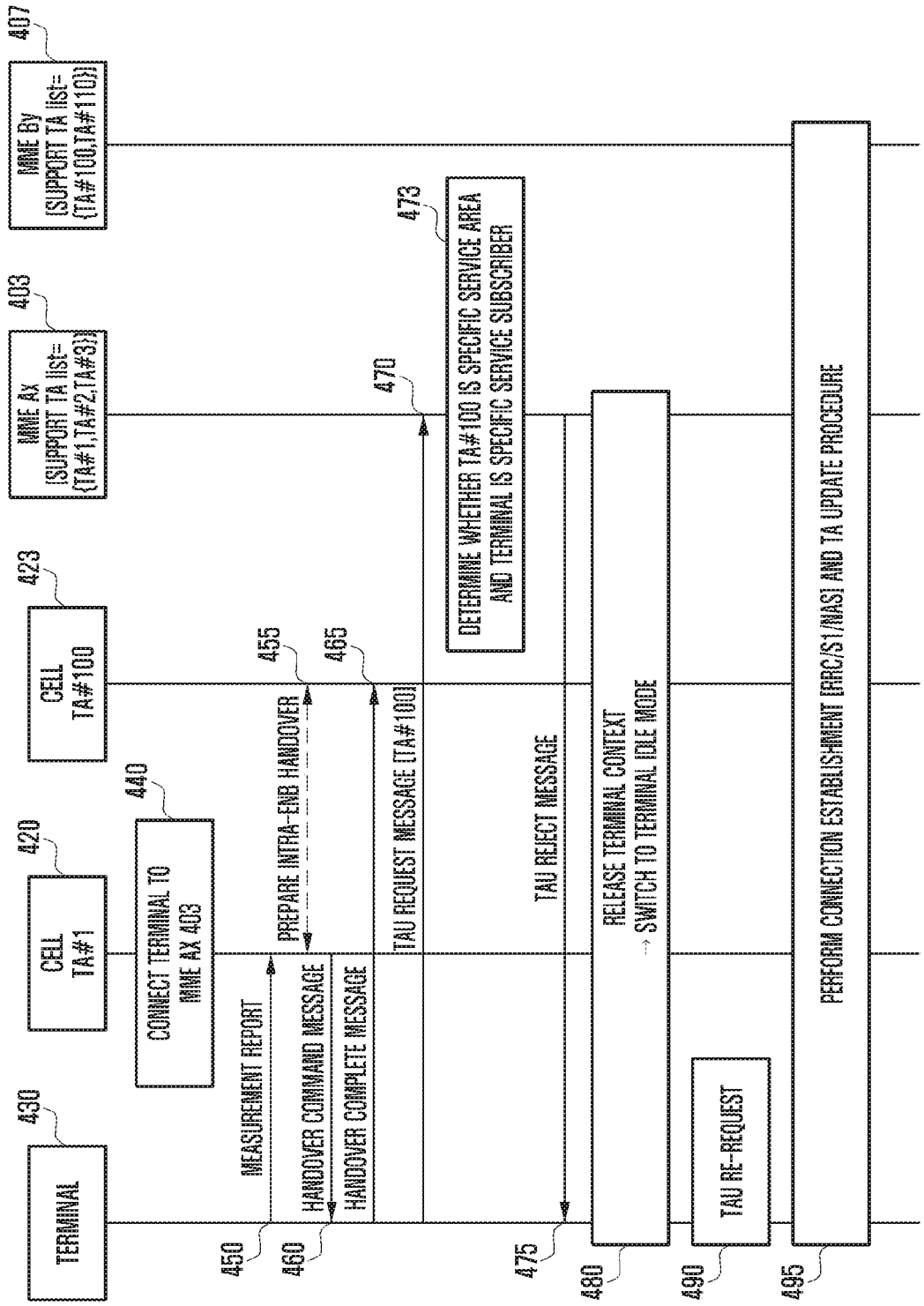

FIGS. 4A and 4B are diagrams illustrating a case where a terminal performs intra-eNB S1 handover in a network environment in which a plurality of cells in a base station are managed by several MME groups.

More specifically, FIG. 4A is a diagram illustrating a case where a terminal performs intra-eNB S1 handover in the network environment illustrated in FIG. 2B. Referring to FIG. 4A, in addition to MME group A 400 for general subscribers, MME group B 405 for specific service subscribers are classified. A base station 410 located in an area in which the specific service can be supported is connected to both-side MME groups. A plurality of cells 420, 423, and 425 are included in the same base station 410, and general services can be supported in all the plurality of cells 420, 423, and 425 through MME Ax 403 in the MME group A 400, but the specific services can be supported only in the cell 423 belonging to TA #100 and the cell 425 belonging to TA #110. That is, the TA list corresponding to the MME group A 400 includes TA #1, TA #2, TA #3, TA #100, and TA #110, and the TA list corresponding to the MME group B 405 includes TA #100 and TA #110.

MME Ax 403 of the MME group A 400 supporting the general service differently registers and manages the TA list in the terminal depending on whether a terminal subscriber has subscribed to the specific service. This is to recognize if the specific service subscriber moves to a specific service possible area. The MME Ax 403 serving the terminal transfers {TA #1, TA #2, TA #3, TA #100, TA #110} corresponding to the registered TA list to the general subscriber, whereas it transfers {TA #1, TA #2, TA #3} corresponding to the registered TA list to the specific service subscriber. If the terminal 430 moves to a TA that is not included in the TA list transferred by the MME Ax 403, it requests TA update.

In this case, if the terminal 430, which is a specific service subscriber being serviced through the MME Ax 403 of the MME group A 400 in the cell belonging to TA #1, performs intra-eNB HO to the cell 423 belonging to TA #100, it recognizes entering into a new TA, and requests TA update. Since the terminal is the specific service subscriber, the serving MME 403 of the terminal 430 rejects the TA update request so that the terminal can be provided with the specific service through re-accessing MME By 407 of the MME group B 405.

Accordingly, the terminal 430 re-requests the TA update after shifting from a connection mode to an idle mode. Thereafter, the terminal performs connection setup to the network again, and cannot resume the service until the TA update succeeds. If the base station 410 does not select a proper MME, that is, MME 407 belonging to the MME group B connected to the cell 423 belonging to TA #100 and supporting the specific service, failure of the TA update may be repeated.

Referring to FIG. 4B, against the problem as described above with reference to FIG. 4A, operations of respective devices can be known. More specifically, the specific service subscriber terminal 430 in a connected state 440 to the cell 420 receives and registers TA list={TA #1, TA #2, TA #3} as described above. In this case, if the specific service subscriber terminal 430 is a general service subscriber terminal, it may receive and register TA list={TA #1, TA #2, TA #3, TA #100, TA #110} as described above. The terminal 330 may transmits a measurement report to the cell 420 (450). It is assumed that the TA of the area to which the cell 420 belongs is TA #1. If a handover to the cell 423 of which the TA is TA #100 is determined based on the measurement report, the cell 420 may prepare the intra-eNB handover to the cell 423 (455), and may transmit a handover command message to the terminal 430 (460). In response to the reception of the handover command message, the terminal 430 may transmit a handover complete message to the cell 423. If it is identified that the TA of the cell 423 is not in the registered TA list, the terminal 430 may transmit a tracking area update (TAU) request message to MME Ax 403 belonging to the MME group A (470). In this case, the terminal 430 may include TA #100 that is the TA of the cell 423 in the TAU request message to be transmitted. The MME Ax 403 may determine whether TA #100 that is the TA included in the received TAU request message is a specific service area and whether the terminal 430 is a specific service subscriber (473). The MME Ax 403 may transmit a TAU reject message to the terminal 430 to relocate the serving MME of the terminal (475).

Thereafter, the terminal 430 performs a terminal context release procedure in response to the received TAU reject message, and switches to the idle mode (480). Thereafter, the terminal re-requests the TAU (490), and in accordance with the TAU re-request, performs a connection establishment operation and TA update procedure through RRC, S1, and NAS messages between the terminal and MME By 407 (495). Even in this case, the TAU failure may be repeated until the base station 410 selects and connects the MME that belongs to TA #100 and supports the specific service in the connection setup process.

Hereinafter, a method for relocating a serving MME of a terminal to a suitable MME while maintaining a connection mode state in case where serving MME relocation of the terminal is necessary due to inter-cell handover in a base station in a network environment in which a plurality of are managed by several MME groups will be described.

Figure 5:
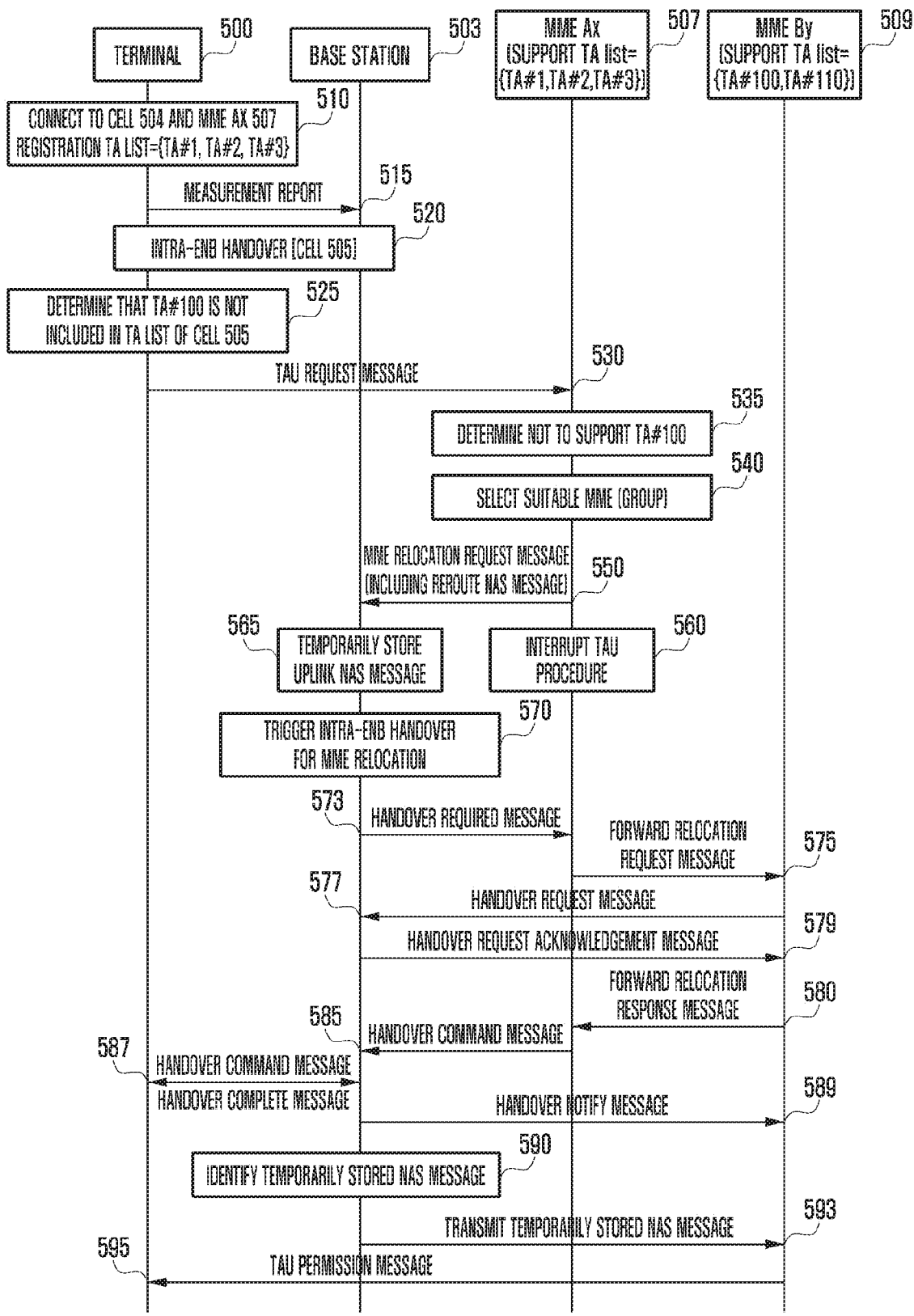
FIG. 5 is a diagram explaining operations of respective devices in case where a terminal performs intra-eNB S1 handover in a network environment in which a plurality of cells in a base station are managed by several MME groups according to an embodiment of the present disclosure.

FIG. 5 is a diagram explaining operations of respective devices in case where a terminal performs intra-eNB S1 handover in a network environment in which a plurality of cells in a base station are managed by several MME groups according to an embodiment of the present disclosure.

More specifically, a case where a terminal performs intra-eNB S1 handover in a network environment in which a plurality of cells in a base station are managed by several MME groups according to an embodiment of the present disclosure will be described.

The list of TAs that can be supported by an MME group to which MME Ax 507 belongs includes {TA #1, TA #2, TA #3}, and the list of TAs that can be supported by an MME group to which MME By 509 includes {TA #100, TA #110}. A terminal 500 is connected to a cell 504 and MME Ax 507, and receives and registers TA list={TA #1, TA #2, TA #3} from the MME Ax 507 (510). Thereafter, the terminal 500 may transmit a measurement report to a base station 503 (515). Thereafter, if the base station 503 determines a handover to a cell 505 based on the measurement report, an intra-eNB handover may be performed between the terminal 500 and the base station 503 (520). Thereafter, the terminal 500 may determine that TA #100 to which the handover cell 505 belongs is not included in the registered TA list (525), and then may transmit a TAU request message to the MME Ax 507 that is the serving MME (530). The terminal may include TA #100 that is a TA to which the new cell 505 belongs in the TAU request message, and may transmit the TAU request message to the MME Ax 507 that is the serving MME.

The MME Ax 507 may determine non-support of TA #100 included in the TAU request message transmitted by the terminal 500. That is, the MME Ax 507 may determine whether it is necessary to change the serving MME of the terminal (535). Further, the MME Ax 507 may select "a suitable MME group or MME" to request MME relocation (540). The MME Ax 507 may select a global MME group ID indicating the suitable MME group or MME or globally unique MME identity (GUMMEI). The MME Ax 507 may combine at least one of information as follows to select the suitable MME group.

TA for each MME pool and service mapping information

UE usage type, subscriber information, and service subscription information

Additional GUTI (GUTI transmitted by the terminal through the TAU request message may be used as it is, or may be included in accordance with MME determination)

The MME Ax 507 may include transmit to the base station 503 an MME relocation request message including a REROUTE NAS message (550). The MME relocation request message may include a message for requesting an intra-eNB HO with MME relocation for the MME relocation request. The REROUTE NAS message may call a message for rerouting the TAU request message receive from the terminal at operation 530. In this case, the MME Ax 507 may drive a wait timer, and may interrupt the TAU procedure until the wait time expires or an "MME relocation S1 handover" procedure starts (560). The MME relocation request message may include at least one of the following information elements (IE).

Indicator indicating a serving MME relocation request,

Indicator calling a terminal of which the serving MME should be relocated

The suitable MME group information (global MME group ID or GUMMEI)

Indicator indicating whether rerouting of an uplink NAS message is necessary after an "MME relocation handover" procedure and the uplink NAS message to be rerouted (TAU request message at operation 530)

Additional GUTI (Optional)

Further, the MME relocation request message may define a new message or may add a new IE to a REROUTE NAS MESSAGE REQUEST message that is currently under discussion in $3^{rd}$ generation partnership project (3GPP) Rel-13 or currently used S1 message. Further, a method for including a designated cause that means MME relocation request in the currently used S1 message. However, the above-described method corresponds to various embodiments of the present disclosure, and a method for transmitting the MME relocation request message is not limited thereto. The base station 503 having received the MME relocation request message may temporarily store a TAU request message that is an uplink NAS message included in the MME relocation request message (565). Thereafter, the base station 503 may trigger an intra-eNB handover with MME relocation (570). As a source eNB, the base station 503 may determine a cell 505 that is the current serving cell as a target cell of an intra-eNB HO with MME relocation. Further, the base station 503 may determine "suitable MME (group) selection information" included in the MME relocation request message, if possible, the TA selected in accordance with the additional GUTI. If the "suitable MME (group) selection information" included in the MME relocation request message or the TA selected in accordance with the additional GUTI is unable to be determined, or if the MME relocation request message does not include the "suitable MME (group) selection information" or additional GUTI, the base station 503 may determine the selected TA using the "suitable MME (group) selection information" preconfigured in the base station 503. Further, during configuration of "source eNB to target eNB transparent container", the base station 503 may add an indicator (new information element) indicating the intra-eNB HO with MME relocation. The operation of the base station 503 will be described in detail with reference to FIGS. 10A and 10B.

Thereafter, the base station 503 may transmit an S1 handover REQUIRED message to the MME Ax 507 (573). The base station 503 may include the handover target cell at operation 570, the selected TA, and the "source eNB to target eNB transparent container" generated at operation 570 in the S1 handover REQUIRED message as the target identifier (ID).

If the S1 handover REQUIRED message is received from the base station 503, the MME Ax 507 may end the TAU procedure interrupted at operation 560. Thereafter, the MME Ax 507 may select the MME By 509 that is the target MME in accordance with the target ID included in the received S1 handover REQUIRED message, and may transmit a FORWARD RELOCATION request message to the selected MME By 509 (575). In response to the reception of the FORWARD RELOCATION request message, the MME By 509 may transmit the S1 handover request message to the base station 503 (577).

The base station 503 may recognize the intra-eNB HO with MME relocation from the indicator included in the source eNB to target eNB transparent container transmitted from the source base station to the target base station and included in the S1 handover request message. If the requested S1 handover is the intra-eNB HO with MME relocation, the base station may process the handover so that the current radio configuration of the terminal is not relocated as much as possible. Thereafter, the base station 503 may transmit a handover request acknowledgement message to the MME By 509 (579).

Thereafter, the MME By 509 may transmit a FORWARD RELOCATION response message to the MME Ax 507 (580). The MME Ax 507 may transmit an S1 handover command message to the base station 503. The base station 503 may transmit a handover command message (RRC CONNECTION RECONFIGURATION) for the intra-eNB HO with MME relocation to the terminal (585). Thereafter, if a handover complete message (RRC CONNECTION RECONFIGURATION COMPLETE) is received from the terminal 500, the base station 503 may transmit an S1 handover notify message to the MME By 509 to notify of the completion of the handover procedure with the terminal (589).

Thereafter, the base station 503 may identify whether any temporarily stored NAS message exist (590). The NAS message may include the TAU request message temporarily stored at operation 565. If the temporarily stored uplink NAS message exists, the base station 503 may transmit the temporarily stored NAS message to the MME By 509 (593). The MME By 509 may transmit a TAU ACCEPT message to the terminal after processing the received NAS message, that is, the TAU request message (495). Thereafter, the terminal 500 can be continuously provided with the service from the MME By 509 and the cell 505 in a connection mode state.

On the other hand, in FIG. 5, the TAU message is described as an example of the NAS message, but is not limited thereto. That is, any NAS message used for transmission/reception between the terminal and the MME can be applied within a range that would not run counter to the gist of the embodiment of FIG. 5 regardless of the type of the NAS message. For example, an attach request message or a service request message may be an example thereof.

Further, in FIG. 5, the message is called the NAS message, but the message is not necessarily limited to the term "NAS". For example, if a protocol for message transmission/reception between a terminal performing wireless communication and a certain node constituting a core network is defined, all types of messages and information that are transmitted/received through the defined protocol could be applied to the embodiment of FIG. 5.

Figure 6:
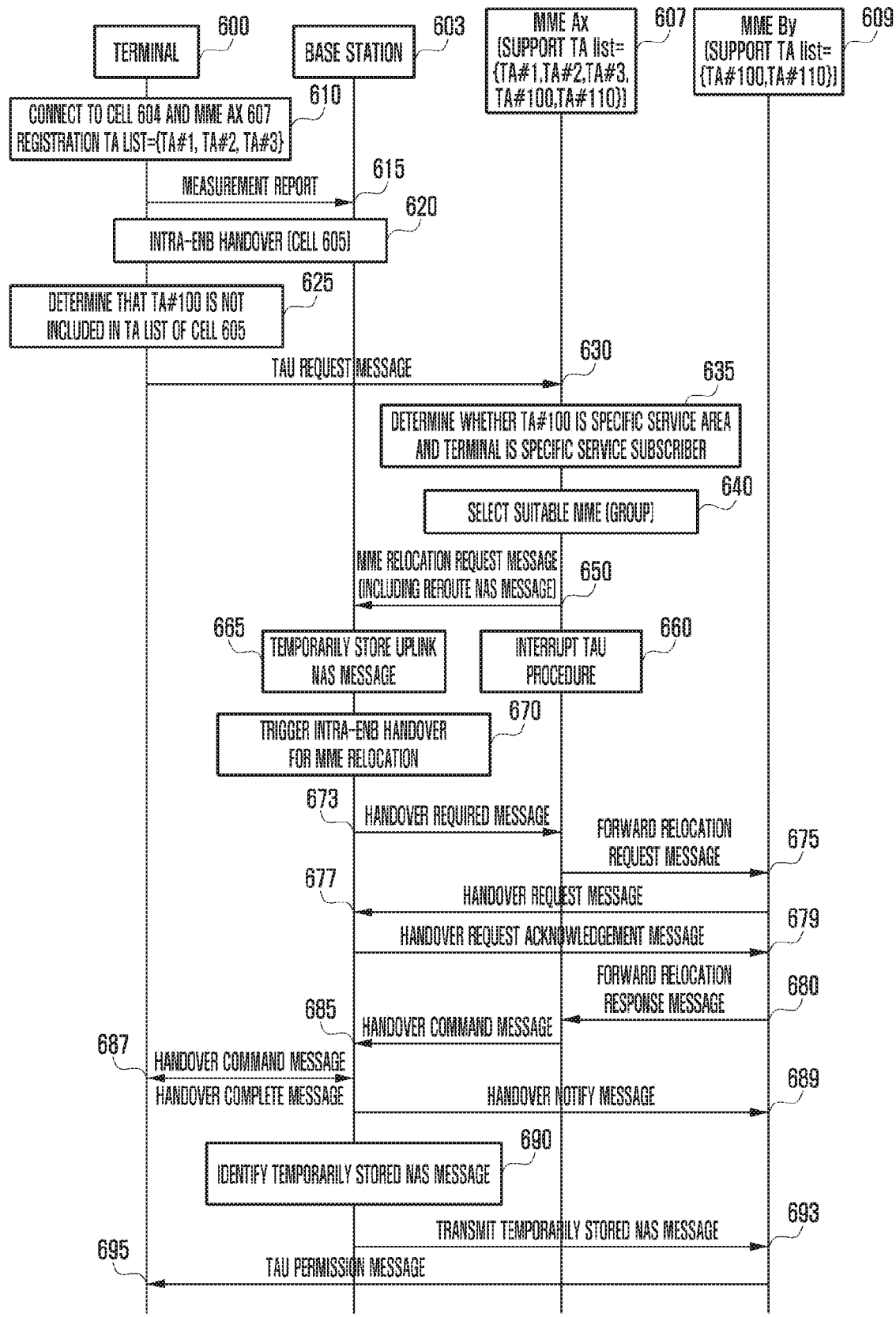
FIG. 6 is a diagram explaining operations of respective devices in case where a terminal performs intra-eNB S1 handover in a network environment in which a plurality of cells in a base station are managed by several MME groups according to an embodiment of the present disclosure.

FIG. 6 is a diagram explaining operations of respective devices in case where a terminal performs intra-eNB S1 handover in a network environment in which a plurality of cells in a single base station are managed by several MME groups according to an embodiment of the present disclosure.

More specifically, a case where a terminal performs intra-eNB S1 handover in a network environment in which a plurality of cells in a single base station are connected to several MME groups for each provided service according to an embodiment of the present disclosure will be described.

The list of TAs that can be supported by an MME group to which MME Ax 607 belongs includes {TA #1, TA #2, TA #3, TA #100, TA #110}, and the list of TAs that can be supported by an MME group to which MME By 609 includes {TA #100, TA #110}. A terminal 600 is connected to a cell 604 and MME Ax 605. The MME Ax 607 may differently manage the TA list registered in a general service subscriber terminal and a specific service subscriber terminal. The specific service may be called a service discriminatingly provided to specific terminals only, and may include an additional service to which a terminal user has subscribed, and preferably, an emergency services network. Further, the information indicating that the terminal has subscribed to the specific service may be included in subscriber information to be stored in a home subscriber server (HSS), and be included in a PHY message transmitted from the terminal to the base station or the NAS message transmitted from the terminal to the MME. The embodiment including the information indicating that the terminal has subscribed to the specific service corresponds to an embodiment to which the present disclosure can be applied, but the present disclosure is not limited thereto.

If the terminal is a specific service subscriber terminal, it may perform registration through reception of {TA #1, TA #2, TA #3} that is the TA list from the MME Ax 605. If the terminal is not the specific service subscriber terminal, it may perform registration through reception of {TA #1, TA #2, TA #3, TA #100, TA #110} that is the TA list that can be supported by the MME group to which the MME Ax 607 belongs. In this embodiment, explanation will be made on the assumption that the terminal 600 is the specific service subscriber terminal, and the terminal 600 can perform registration through reception of TA list={TA #1, TA #2, TA #3} from the MME Ax 605 (610). Thereafter, operations 615 to 630 are equal to operations 515 to 530 as described above with reference to FIG. 5. Thereafter, the MME Ax 607 is a specific serviceable area corresponding to TA #100 that is a new TA included in the TAU request message transmitted by the terminal, and the terminal may determine the specific service subscription terminal (635). That is, the MME Ax 607 can detect the necessity of the serving MME relocation of the terminal. The MME Ax 607 may determine that the terminal is the specific service subscription terminal based on the information element included in the TAU request message transmitted by the terminal at operation 630. The method in which the above-described MME Ax 607 determines that the terminal is the specific service subscription terminal corresponds to an embodiment, but the present disclosure is not limited thereto. Thereafter, operations 640 to 695 at which the terminal 600 performs S1 handover for the MME relocation are equal to operations 540 to 595 of FIG. 5 as described above.

On the other hand, in FIG. 6, the TAU message is described as an example of the NAS message, but is not limited thereto. That is, any NAS message used for transmission/reception between the terminal and the MME can be applied within a range that would not run counter to the gist of the embodiment of FIG. 6 regardless of the type of the NAS message. For example, an attach request message or a service request message may be an example thereof.

Further, in FIG. 6, the message is called the NAS message, but the message is not necessarily limited to the term "NAS". For example, if a protocol for message transmission/reception between a terminal performing wireless communication and a certain node constituting a core network is defined, all types of messages and information that are transmitted/received through the defined protocol could be applied to the embodiment of FIG. 6.

Figure 7:
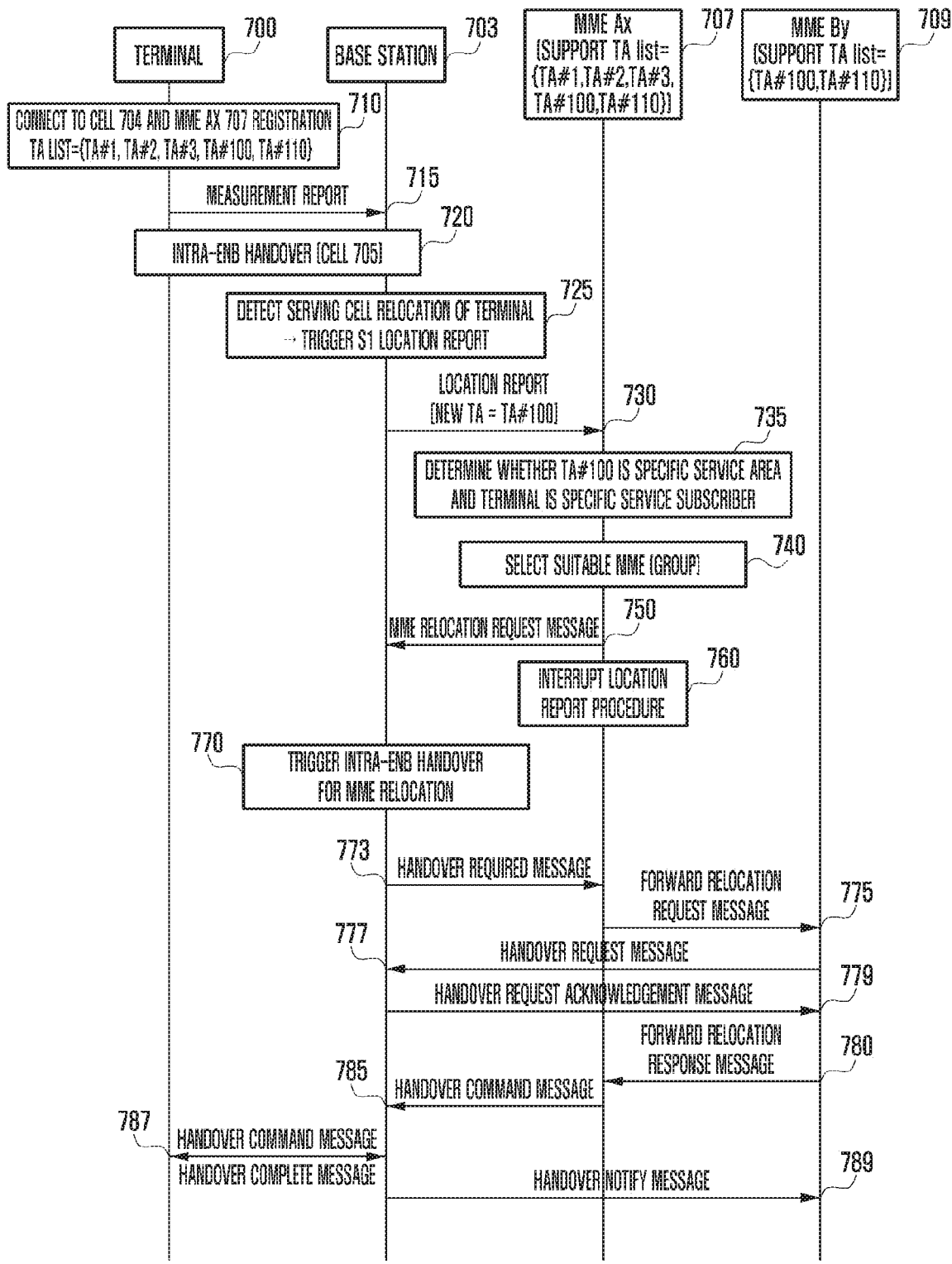
FIG. 7 is a diagram explaining operations of respective devices in case where a terminal performs intra-eNB S1 handover in a network environment in which a plurality of cells in a base station are managed by several MME groups according to an embodiment of the present disclosure.

FIG. 7 is a diagram explaining operations of respective devices in case where a terminal performs intra-eNB S1 handover in a network environment in which a plurality of cells in a single base station are managed by several MME groups according to an embodiment of the present disclosure.

More specifically, a case where a terminal performs intra-eNB S1 handover in a network environment in which a plurality of cells in a single base station are connected to several MME groups for each provided service and a registered TA list of a specific service subscriber terminal and a registered TA list of a general service subscriber terminal are equally managed.

The list of TAs that can be supported by an MME group to which MME Ax 707 belongs includes {TA #1, TA #2, TA #3, TA #100, TA #110}, and the list of TAs that can be supported by an group to which MME By 709 includes {TA #100, TA #110}. A terminal 700 is connected to a cell 704 and MME Ax 705. In this case, the terminal 700 may perform registration through reception of {TA #1, TA #2, TA #3, TA #100, TA #110} that is the TA list that can be supported by the MME group to which the MME Ax 707 belongs (710). Thereafter, operations 715 and 720 are equal to operations 515 and 520 as described above with reference to FIG. 5. At operation 523 of FIG. 5, the terminal 500 determines that it deviates from the TA area by determining that TA #100 is not included in the TA list registered by the terminal 500. However, in this embodiment, the base station 703 may perform intra-eNB handover at operation 720, and then detects the serving cell relocation of the terminal and trigger a S1 location report (725).

If a location report request in accordance with the serving cell relocation is received from the MME Ax 707 the base station 703 may trigger the S1 location report. Thereafter, the base station 703 transmits the S1 location report 730 to the MME Ax 707. The S1 location report message may include at least one of a global E-UTRAN cell ID indicating a new relocated serving cell of the terminal, TA #100 that is the new TA, and request type information requested when the MME Ax 707 requests the location report. Thereafter, operations 735 to 740 are equal to operations 635 to 640 as described above with reference to FIG. 6. Thereafter, the MME Ax 707 may transmit an MME relocation request message (750). In this case, the MME Ax 707 may drive a wait timer, and may interrupt a procedure of receiving the location report until the wait time expires or an "MME relocation S1 handover" procedure starts (760). In this case, unlike FIG. 5 or 6, since the terminal 700 does not transmit the TAU request message to the MME Ax 707, the MME Ax 705 does not include and transmit a REROUTE NAS message. Further, the base station 703 does not temporarily stored the REROUTE NAS message. Thereafter, the base station 503 may trigger the intra-eNB handover 770 with MME relocation, and thereafter, the process in which the terminal 700 performs and completes the handover to the MME By 709 is equal to the process at operations 573 to 589 of FIG. 5. However, in this embodiment, since the terminal 700 does not transmit the TAU request message to the MME Ax 707 it does not transmit the TAU request message that is the temporarily stored NAS message to the MME By 709.

Figure 8:
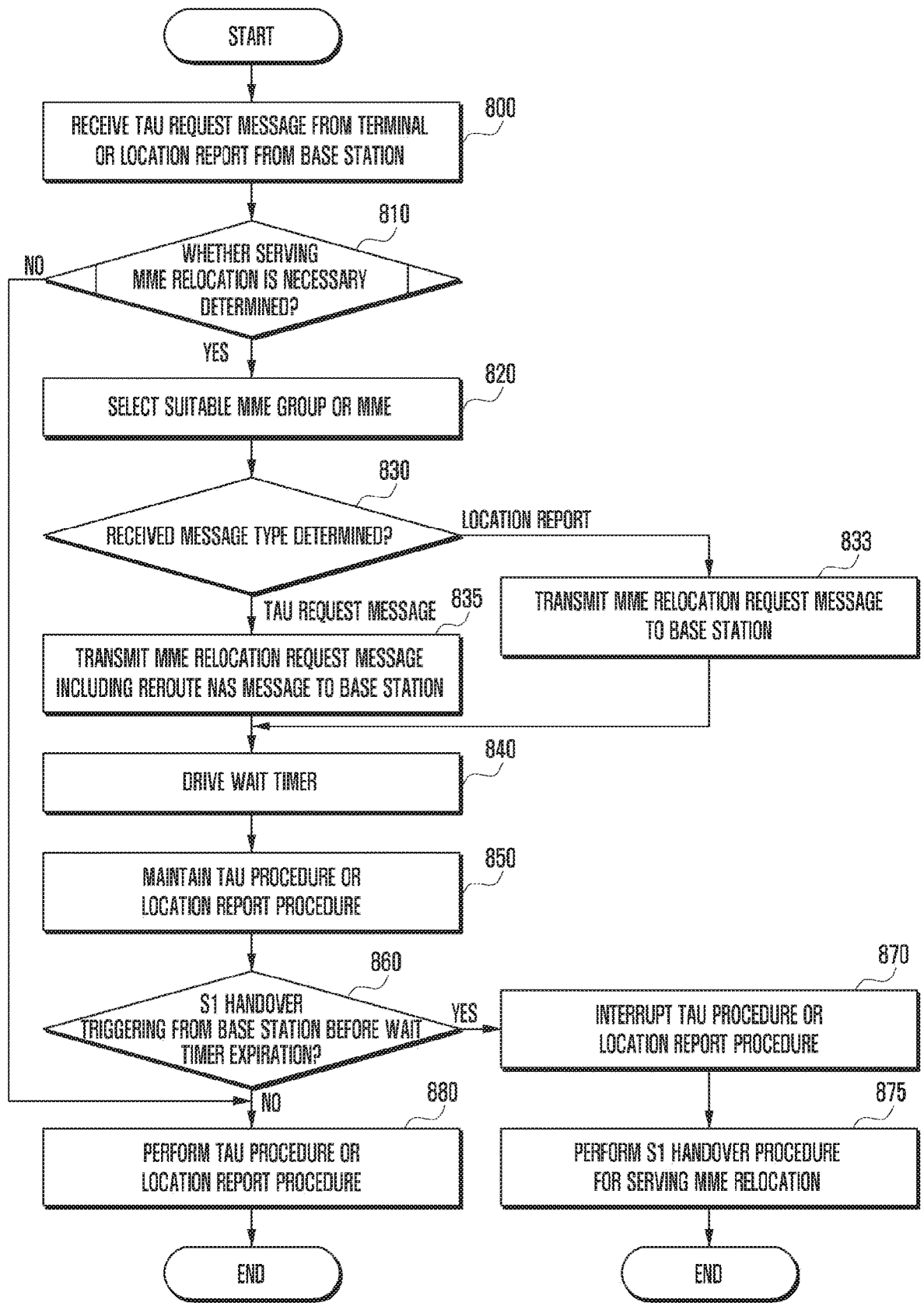
FIG. 8 is a flowchart explaining an operation of a serving mobile management entity (MME) according to an embodiment of the present disclosure.

FIG. 8 is a flowchart explaining an operation of a serving mobile management entity (MME) according to an embodiment of the present disclosure.

A serving MME may receive a TAU request message from a terminal, or may receive a location report from a base station (800). The serving MME may determine whether serving MME relocation is necessary based on the received TAU request message or location report (810). More specifically, the serving MME requires location update if the terminal deviates from a TA area in which the terminal is registered, but if the current serving MME does not support the current location of the terminal, that is, a new TA, or if the terminal is a specific service subscriber and can be serviced by the specific service dedicated MME in the current location of the terminal, that is, the new TA, the serving MME may determine whether the serving MME relocation is necessary. The above-described operation will be described in more detail with reference to FIG. 9.

If it is determined that the serving MME relocation is not necessary, the serving MME may perform a TAU procedure or a location report procedure in accordance with the received TAU request message or location report (880). Thereafter, the serving MME may select a suitable MME group or MME (820). The MME Ax 507 may select a global MME group ID or globally unique MME identity (GUMMEI) indicating the suitable MME group or MME.

The serving MME may determine the type of the message received at operation 800. If the received message is the TAU request message, the serving MME may transmit to the base station the MME relocation request message including the REROUTE NAS message (835). The REROUTE NAS message may call a message for the MME to reroute the TAU request message received from the terminal. Further, if the received message is a location report message, the serving MME may transmit to the base station the MME relocation request message that does not include the REROUTE NAS message (833). The information element (IE) included in the MME relocation request message is the same as that as described above with reference to FIG. 5.

Thereafter, the serving MME may drive a wait timer, and may interrupt the TAU procedure or the location report procedure until the wait time expires or an "MME relocation S1 handover" procedure starts (850). Further, the serving MME may determine whether the S1 handover has been triggered from the base station before the timer expiration (860). Triggering of the S1 handover from the base station may include reception of a handover REQUIRED message. If the S1 handover is not triggered from the base station before the timer expiration, the serving MME may perform the TAU procedure or the procedure of receiving the location report in accordance with the received TAU request message or location report (880).

If it is determined that the S1 handover is triggered from the base station before the time expiration at operation 860, the serving MME may interrupt the TAU procedure or the procedure of receiving the location report (870). Thereafter, the serving MME may perform the S handover procedure for serving MME relocation in accordance with the determination at operation 810 (875).

Figure 9:
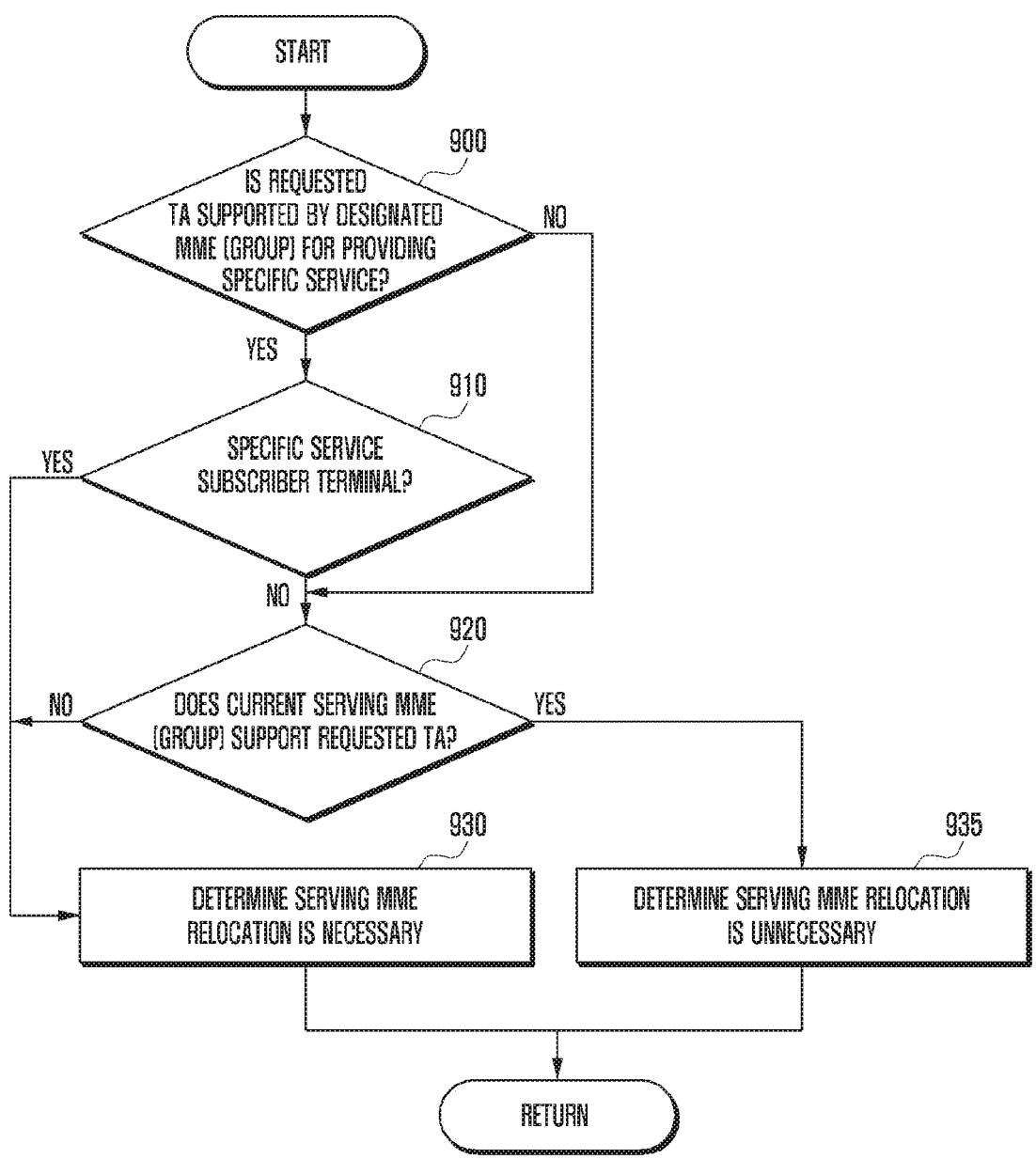
FIG. 9 is a flowchart explaining in detail an operation of a serving mobile management entity (MME) to determine whether a serving MME relocation of the serving MME is necessary according to an embodiment of the present disclosure.

FIG. 9 is a flowchart explaining in detail an operation of a serving mobile management entity (MME) to determine whether a serving MME relocation of the serving MME is necessary according to an embodiment of the present disclosure.

More specifically, operation 810 as described above with reference to FIG. 8 will be described in more detail.

The MME may determine whether the TAU request message received from the terminal or the requested TA information included in the location report received from the base station is supported by the MME group or MME designated to provide the specific service (900). If the new TA information is supported by the designated MME group or MME for providing the specific service, the MME may determine whether a terminal user is a specific service subscriber (910). If the terminal user is the specific service subscriber, it may be determined that the serving MME requires the serving MME relocation. If the terminal user is not the specific service subscriber at operation 910, it may be determined whether the current serving MME group or MME supports the requested new TA (920). Further, if the requested TA information is not supported by the designated MME group or MME for providing the specific service at operation 900, the serving MME may determine whether the current serving MME group or MME supports the requested TA (920). If the serving MME group or MME does not support the requested TA, the serving MME may determine that the serving MME relocation is necessary (930). If the serving MME group or MME supports the requested TA, the serving MME may determine that the serving MME relocation is unnecessary (935).

Figure 10A:
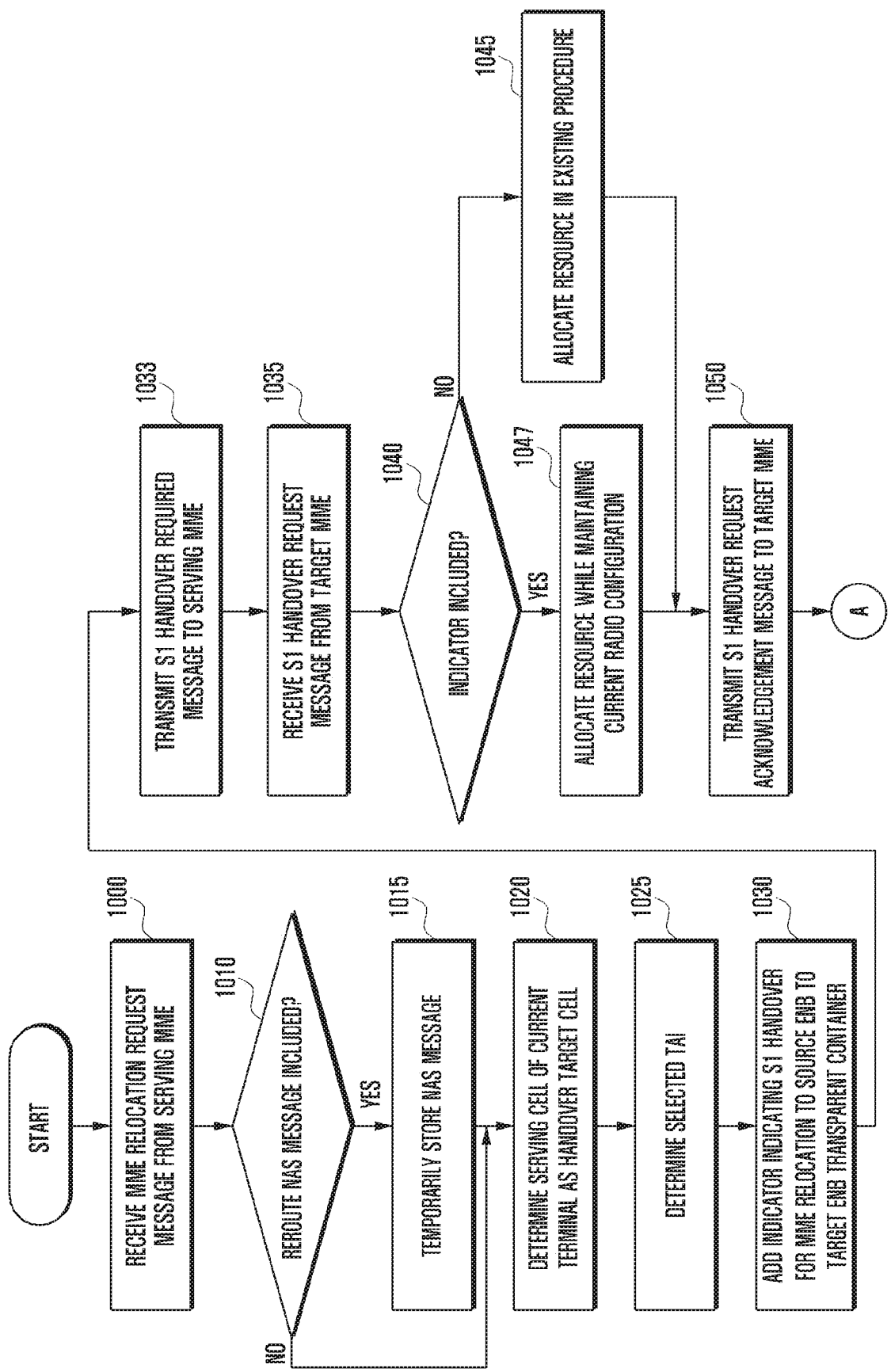
FIGS. 10A and 10B are flowcharts explaining an operation of a base station according to an embodiment of the present disclosure.
Figure 10B:
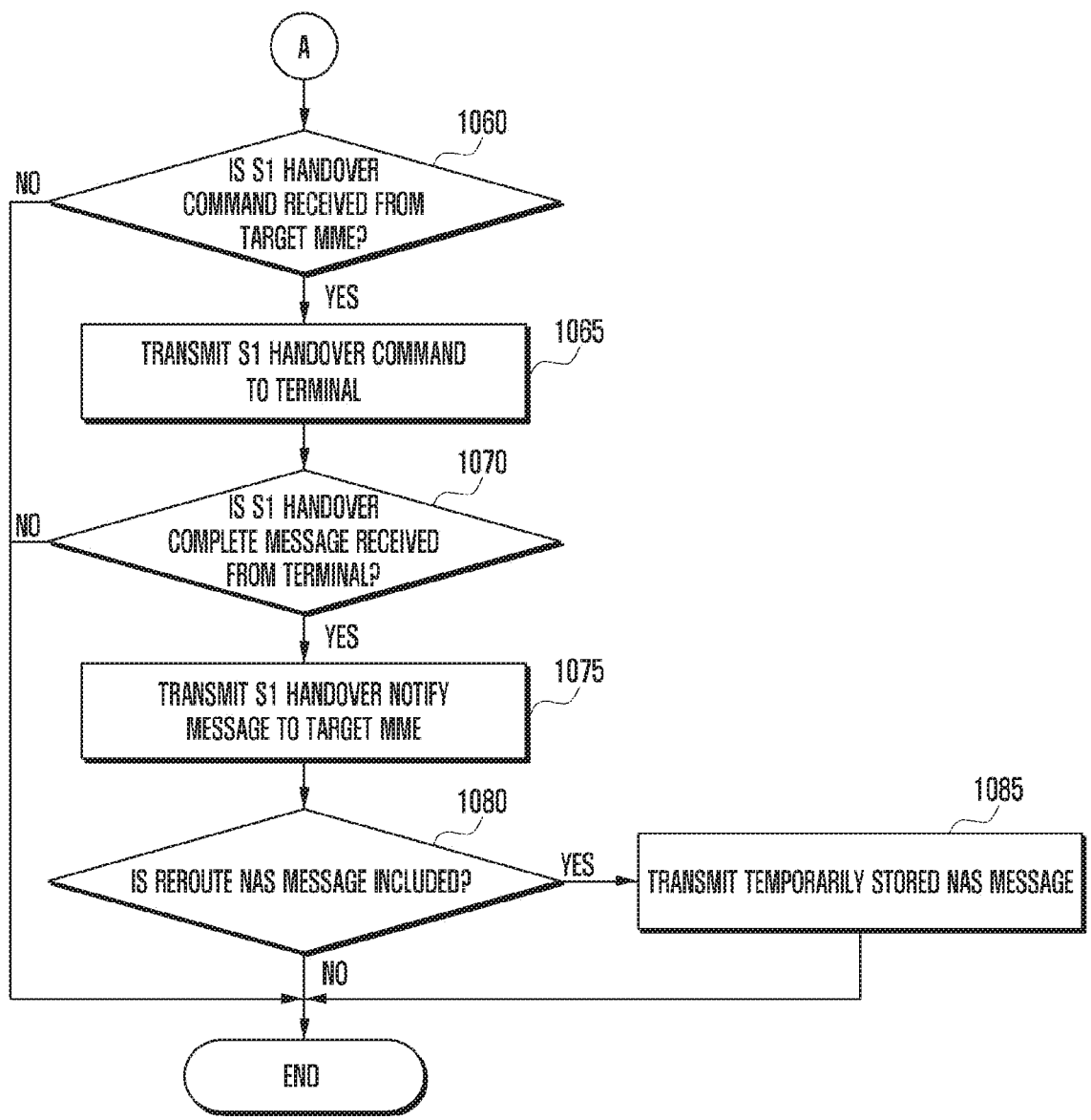

FIGS. 10A and 10B are flowcharts explaining an operation of a base station according to an embodiment of the present disclosure.

The base station may receive the MME relocation request message from the MME (1000). The base station may receive the MME relocation request message as a source eNB of a handover. The base station may determine whether the REROUTE NAS message is included in the received MME relocation request message (1010). The REROUTE NAS message may call a message for the MME to reroute the TAU request message received from the terminal. If the REROUTE NAS message is included in the received MME relocation request message, the base station may temporarily store the NAS message (1015). If the REROUTE NAS message is not included in the received MME relocation request message, the base station does not temporarily store the NAS message. Thereafter, the base station may determine the serving cell of the current terminal as a handover target cell (1020). The base station may determine the selected TAI (1025). More specifically, the base station may determine the selected TAI in accordance with suitable MME group selection information included in the MME relocation request message and selectively included additional GUTI. The detailed determination method is as follows.

First, if the additional GUTI is included in the MME relocation request message, and the additional GUTI and MME information called by the suitable MME group selection information coincide with each other, the base station may select the TA supported by the MME indicated by the additional GUTI among supported TAs of the handover target cell. Further, if the additional GUTI is not included in the MME relocation request message, or the additional GUTI and MME information called by the suitable MME group selection information do not coincide with each other, the base station may select the TA supported by the MME group or MME called by the suitable MME group selection information among support TAs of the handover target cell. Further, if the selection has not been made in the two methods as described above, the TA may be selected from the remainders excluding the TA of the current serving MME among the supported TAs of the handover target cell.

After determining the selected TAI, the base station may add an indicator indicating S1 handover for MME relocation to a "source eNB to target eNB transparent container" (1030). Thereafter, the base station may transmit the S1 handover REQUIRED message to the serving MME (1033). The base station may receive the S1 handover request message from a target MME included in the MME group supporting the selected TAI (1035). The base station may receive the S1 handover request message as a target eNB of the handover. The base station may determine whether the indicator previously added at operation 1030 is included in the S1 handover request message. If the indicator is not included, the base station may allocate a resource for performing S1 handover in the existing procedure 91045). If the indicator is included, this means the S1 handover for the MME relocation, and thus the base station may allocate the resource while maintaining the current radio configuration (1047).

Thereafter, the base station may transmit an S1 handover request acknowledgement message to the target MME (1050). The base station may determine whether an S1 handover command is received from the target MME. If the S1 handover command is not received, the base station may end the intra-eNB handover procedure with MME relocation, and may delete the NAS message stored at operation 1015. If the S1 handover command is received from the target MME, the base station may transmit the S1 handover command to the terminal (1065). The S1 handover command may include an RRC connection reconfiguration message. Further, the base station may determine whether an S1 handover complete message is received from the terminal (1070). If the S1 handover complete message is not received from the terminal, the base station may end the intra-eNB S1 handover procedure with MME relocation, and may delete the NAS message stored at operation 1015. If the S1 handover complete message is received from the terminal, the base station may transmit an S1 handover notify message to the target MME (1073). The base station may determine again whether the REROUTE NAS message is included in the MME relocation request message as determined at operation 1010 (1080), and if the REROUTE NAS message is included, the base station may transmit the NAS message temporarily stored at operation 1015 (1085). The REROUTE NAS message may call a message for the MME to reroute the TAU request message received from the terminal. If the REROUTE NAS message is not included in the MME relocation request message, the procedure may be ended.

Further, the present disclosure may be applied to a case where one base station simultaneously contains a general subscriber and an enterprise subscriber, and provides a service for the enterprise subscriber only in an area in which the corresponding enterprise is located. In this case, for security of enterprise related information, the base station may operate the enterprise subscriber dedicated MME group, maintain the connection state when the enterprise subscriber enters into the TA in which the enterprise is located, and perform the S1 handover to the dedicated MME group.

Further, the present disclosure may be applied to currently rising emergency network services. In order to eliminate an influence caused by general subscriber services and general subscriber traffics in a state where one base station simultaneously accommodates general subscribers and emergency network subscribers, a dedicated MME group only for the emergency network subscribers may be operated. In this case, in the same manner, an emergency network subscriber may perform S1 handover to the dedicated MME group while maintaining the connection state in case of entering into the TA of a specific area. Further, the present disclosure can also be applied even in case of operating MME groups for mobile communication service providers while sharing the same base station resources between the mobile communication service providers (RAN sharing).

Figure 11:
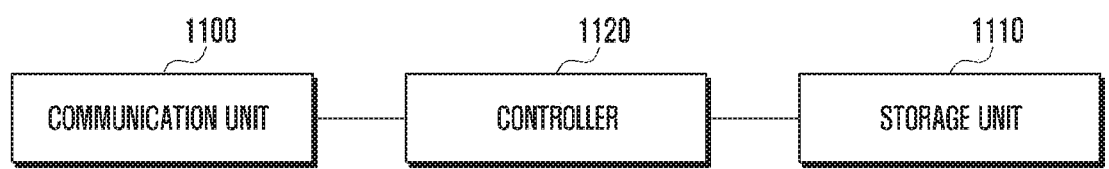
FIG. 11 is a block diagram illustrating the internal structure of a mobile management entity (MME) according to an embodiment of the present disclosure.

FIG. 11 is a block diagram illustrating the internal structure of a mobile management entity (MME) according to an embodiment of the present disclosure.

More specifically, the MME may include a communication unit 1100, a storage unit 1110, and a controller 1120.

The communication unit 1100 may transmit/receive signals required for the MME to perform operations according to the present disclosure. More specifically, the communication unit 1100 may receive a TAU request message from a terminal, and may transmit an MME relocation request message to a base station. Further, the MME relocation request message may include a REROUTE NAS message. The REROUTE NAS message may call a message for the communication unit to reroute the TAU request message received from the terminal. Further, the communication unit 1100 may receive a location report from the base station. Thereafter, the communication unit 1100 may transmit a FORWARD RELOCATION request message even with respect to a target MME to which the terminal is to perform a handover.

The storage unit 1110 may store information for the MME to perform the operations according to the present disclosure. The storage unit 1110 may store messages received from the communication unit 1100.

The controller 1120 may receive a tracking area update (TAU) request message from the terminal, determine whether serving MME relocation of the terminal is necessary based on the TAU request message, and if it is determined that the serving MME relocation of the terminal is necessary, control to transmit a message for requesting intra-eNB HO with MME relocation to the base station. Further, the controller 1120 may control to determine whether the serving MME relocation of the terminal is necessary based on whether the serving MME supports the tracking area (TA) requested by the terminal and included in the TAU request message. Further, the controller 1120 may control to determine whether the serving MME relocation of the terminal is necessary based on at least one of whether the tracking area requested by the terminal and included in the TAU request message is supported by at least one MME predetermined to provide the specific service and whether the terminal is the terminal having subscribed to the specific service.

Further, the controller 1120 may receive the location report from the base station, and control to determine whether the serving MME relocation of the terminal is necessary based on the location report.

Figure 12:
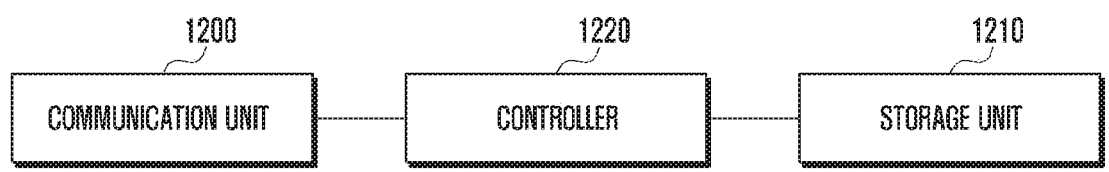
FIG. 12 is a block diagram illustrating the internal structure of a base station according to an embodiment of the present disclosure.

FIG. 12 is a block diagram illustrating the internal structure of a base station according to an embodiment of the present disclosure.

More specifically, More specifically, the base station may include a communication unit 1200, a storage unit 1210, and a controller 1220.

The communication unit 1200 may transmit/receive signals required for the base station to perform operations according to the present disclosure. More specifically, the communication unit 1200 may transmit a TAU request message received from a terminal to a serving MME. Further, after the MME determines that the MME relocation is necessary, the base station may receive an MME relocation request message. The MME relocation request message may include a handover request message for MME relocation request. Further, the communication unit 1200 may transmit a handover REQUIRED message to the serving MME, and may receive a handover request message from a target MME to which the terminal is to perform a handover. Further, the communication unit 1200 may transmit a handover command message to the terminal, and may receive a handover complete message from the terminal.

The storage unit 1210 may store information for the base station to perform the operations according to the present disclosure. The storage unit 1210 may store messages received from the communication unit 1200. The storage unit 1210 may store an uplink NAS message received from the serving MME. The uplink NAS message may include a TAU request message transmitted by the terminal to the serving MME.

The controller 1220 may control to receive a tracking area update (TAU) request message from the terminal, transmit the received TAU request message to the serving MME, and receive a message for requesting intra-eNB HO with MME relocation from the serving MME. Further, the controller 1220 may control to receive a location report request message from the serving MME, and transmit the location report to the serving MME.

In the above-described embodiments, all operations and messages may be selectively performed or may be omitted. Further, in the respective embodiments, it is not necessary that the operations are generated in order, but the order of the operations may be changed. The respective operations and messages may be independently performed.

A part or the whole of a table exemplified in the above-described embodiments is to help detailed understanding of the embodiments of the present disclosure. Accordingly, the detailed contents of the table may be considered to express parts of the method and apparatus proposed in the present disclosure. That is, it is preferable that the contents of the table in the description is significantly approached rather than in syntax.

Meanwhile, preferred embodiments of the present disclosure disclosed in this specification and drawings and specific terms used therein are illustrated to present only specific examples in order to clarify the technical contents of the present disclosure and help understanding of the present disclosure, but are not intended to limit the scope of the present disclosure. It will be evident to those skilled in the art that various implementations based on the technical spirit of the present disclosure are possible in addition to the disclosed embodiments.

The invention claimed is:

1. A method by a mobile management entity (MME) for supporting a handover, the method comprising:
   receiving, from a terminal, a non-access stratum (NAS) message including information on an identity of a tracking area, in case that a tracking area update is requested based on a change of the tracking area, and a handover is determined to the tracking area;
   determining whether the changed tracking area is for a predetermined service based on the information on the identity of the tracking area;
   determining whether the terminal is subscribed to the predetermined service based on subscription information of the terminal;
   determining that a serving MME relocation of the terminal to a MME for the predetermined service is necessary based on the NAS message including the information on the identity of the tracking area, in case that the changed tracking area is for the predetermined service and the terminal is subscribed to the predetermined service;
   transmitting, to a base station, an MME relocation request message, in case that the serving MME relocation of the terminal is determined; and
   stopping a tracking area update (TAU) procedure for the terminal,
   wherein an intra-eNodeB (eNB) handover is performed at the base station based on the MME relocation request message.

2. The method of claim 1, wherein the MME relocation request message comprises a message for requesting an intra-eNode B (eNB) handover with MME relocation.

3. The method of claim 1, wherein whether the serving MME relocation of the terminal is necessary is determined based on:
   whether the tracking area requested by the terminal and based on the information on the identity of the tracking area included in the NAS message is supported by at least one MME predetermined to provide the predetermined service.

4. The method of claim 1,
   wherein the MME relocation request message comprises the NAS message transmitted by the terminal, and
   wherein the NAS message is stored by the base station.

5. The method of claim 1, wherein the MME relocation request message comprises information on at least one MME determined based on the tracking area requested by the terminal and based on the information on the identity of the tracking area included in the NAS message.

6. A method by a base station for supporting a handover, the method comprising:
   receiving, from a terminal, a non-access stratum (NAS) message including information on an identity of a tracking area requested by the terminal, in case that a tracking area update is requested based on a change of the tracking area, and a handover is determined to the tracking area;
   transmitting the NAS message to a serving MME;
   receiving an MME relocation request message from the serving MME, in case that a serving MME relocation of the terminal to a MME for a predetermined service is necessary; and
   performing an intra-eNodeB (eNB) handover based on the MME relocation request message,
   wherein that the serving MME relocation of the terminal to the MME for the predetermined service is necessary is determined based on the NAS message in case that the changed tracking area is for the predetermined service and the terminal is subscribed to the predetermined service,
   wherein whether the changed tracking area is for the predetermined service is determined based on the information on the identity of the tracking area,
   wherein whether the terminal is subscribed to the predetermined service is determined based on subscription information of the terminal, and
   wherein a tracking area update (TAU) procedure for the terminal is stopped at the serving MME.

7. The method of claim 6, wherein the serving MME relocation of the terminal is determined to be necessary based on:
   whether the tracking area requested by the terminal and based on the information on the identity of the tracking area included in the NAS message is supported by at least one MME predetermined to provide the predetermined service.

8. The method of claim 6, further comprising:
   storing the NAS message transmitted by the terminal and included in the MME relocation request message; and
   transmitting the stored NAS message to a relocated MME based on the MME relocation being completed.

9. A mobile management entity (MME) supporting a handover, comprising:
   a transceiver; and
   a controller configured to:
   receive, from a terminal via the transceiver, a non-access stratum (NAS) message including information on an identity of a tracking area, in case that a tracking area update is requested based on a change of the tracking area, and a handover is determined to the tracking area,
   determine whether the changed tracking area is for a predetermined service based on the information on the identity of the tracking area,
   determine whether the terminal is subscribed to the predetermined service based on subscription information of the terminal,
   determine that a serving MME relocation of the terminal to a MME for the predetermined service is necessary based on the NAS message including the information on the identity of the tracking area, in case that the changed tracking area is for the predetermined service and the terminal is subscribed to the predetermined service,
   transmit, to a base station via the transceiver, an MME relocation request message in case that the serving MME relocation of the terminal is determined, and
   stop a tracking area update (TAU) procedure for the terminal,
   wherein an intra-eNodeB (eNB) handover is performed at the base station based on the MME relocation request message.

10. The MME of claim 9, wherein the controller determines whether the serving MME relocation of the terminal is necessary based on:

whether the tracking area requested by the terminal and based on the information on the identity of the tracking area included in the NAS message is supported by at least one MME predetermined to provide the predetermined service.

11. The MME of claim 9,
wherein the MME relocation request message comprises the NAS message transmitted by the terminal, and
wherein the NAS message is stored by the controller.

12. The MME of claim 9, wherein the MME relocation request message comprises information on at least one MME determined based on the tracking area requested by the terminal and based on the information on the identity of the tracking area included in the NAS message.

13. A base station supporting a handover, comprising: a transceiver; and a controller configured to:
receive, from a terminal via the transceiver, a non-access stratum (NAS) message including information on an identity of a tracking area requested by the terminal, in case that a tracking area update is requested based on a change of the tracking area, and a handover is determined to the tracking area,
transmit the NAS message to a serving MME,
receive an MME relocation request message from the serving MME, in case that a serving MME relocation of the terminal to a MME for a predetermined service is necessary, and
perform an intra-eNodeB (eNB) handover based on the MME relocation request message,
wherein that the serving MME relocation of the terminal to the MME for the predetermined service is necessary is determined based on the NAS message in case that the changed tracking area is for the predetermined service and the terminal is subscribed to the predetermined service,
wherein whether the changed tracking area is for the predetermined service is determined based on the information on the identity of the tracking area,
wherein whether the terminal is subscribed to the predetermined service is determined based on subscription information of the terminal, and
wherein a tracking area update (TAU) procedure for the terminal is stopped at the serving MME.

14. The base station of claim 13, wherein the controller is further configured to determine whether the serving MME relocation of the terminal is necessary based on:
whether the tracking area requested by the terminal and based on the information on the identity of the tracking area included in the NAS message is supported by at least one MME predetermined to provide the predetermined service.

15. The base station of claim 13, wherein the controller is further configured to stores the NAS message transmitted by the terminal and included in the MME relocation request message, and control to transmit the stored NAS message to a relocated MME in case that the MME relocation is completed.

* * * * *